US009531308B2

(12) United States Patent
Peterson et al.

(10) Patent No.: US 9,531,308 B2
(45) Date of Patent: Dec. 27, 2016

(54) FAN MOTOR POWER SUPPLY

(71) Applicant: Nidec Motor Corporation, St. Louis, MO (US)

(72) Inventors: Gregory A. Peterson, South Barrington, IL (US); Keith M. Kolmos, Elgin, IL (US); Carolyn S. Schaefer, Arlington Heights, IL (US); Mile Bozic, Bartlett, IL (US); David E. Lass, Addison, IL (US); William J. Taylor, Crystal Lake, IL (US)

(73) Assignee: Nidec Motor Company, St. Louis, MO (US)

( * ) Notice: Subject to any disclaimer, the term of this patent is extended or adjusted under 35 U.S.C. 154(b) by 0 days.

(21) Appl. No.: 14/755,996

(22) Filed: Jun. 30, 2015

(65) Prior Publication Data

US 2015/0381086 A1 Dec. 31, 2015

Related U.S. Application Data

(60) Provisional application No. 62/019,357, filed on Jun. 30, 2014.

(51) Int. Cl.
*H02P 27/00* (2006.01)
*H02P 6/14* (2016.01)
(Continued)

(52) U.S. Cl.
CPC ............... *H02P 6/14* (2013.01); *F04D 25/088* (2013.01); *F04D 27/004* (2013.01); *H02P 27/06* (2013.01); *H02P 2201/11* (2013.01)

(58) Field of Classification Search
CPC .................. H02P 2201/11; H02M 2201/0045; H02M 2001/007; H02M 2001/4291; H02M 3/1582

(Continued)

(56) References Cited

U.S. PATENT DOCUMENTS

2008/0169732 A1 7/2008 Chang
2010/0134054 A1 6/2010 Tseng et al.
2012/0181963 A1* 7/2012 Wang ........................ H02P 6/22
318/400.33

FOREIGN PATENT DOCUMENTS

MY WO 2011138626 A1 * 11/2011 ............. H02P 6/182
WO 2011138626 A1 11/2011

OTHER PUBLICATIONS

PCT International Search Report and Written Opinion from PCT Application No. PCT/US2015/038617 entitled Fan Motor Power Supply (Dated Sep. 22, 2015).

* cited by examiner

*Primary Examiner* — Eduardo Colon Santana
*Assistant Examiner* — Bickey Dhakal
(74) *Attorney, Agent, or Firm* — Hovey Williams LLP

(57) ABSTRACT

A fan having one fan blade; a fan motor for rotating the fan blade; a motor control electrically coupled with the fan motor for controlling operational characteristics of the fan motor; and a power supply having a step-down high efficiency buck converter, a step-down low drop-out linear regulator, and/or a step-down switching regulator are described. The power supply may receive a first input voltage and lower the first input voltage to a second lower voltage. The fan motor is electrically coupled to be driven by the first input voltage and the motor control is electrically coupled to operate using the second lower voltage from the power supply. The motor control may include a microcontroller, level shifters electrically coupled to the microcontroller, and drivers electrically coupled to the level shifters and configured to drive the fan motor.

8 Claims, 23 Drawing Sheets

(51) Int. Cl.
*F04D 25/08* (2006.01)
*F04D 27/00* (2006.01)
*H02P 27/06* (2006.01)

(58) Field of Classification Search
USPC .................................................. 318/400.3
See application file for complete search history.

Fig. 12.

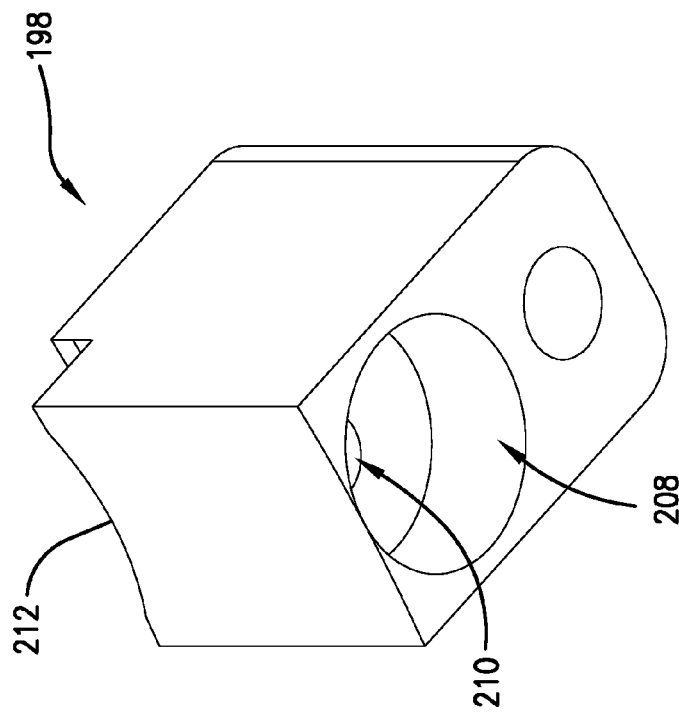
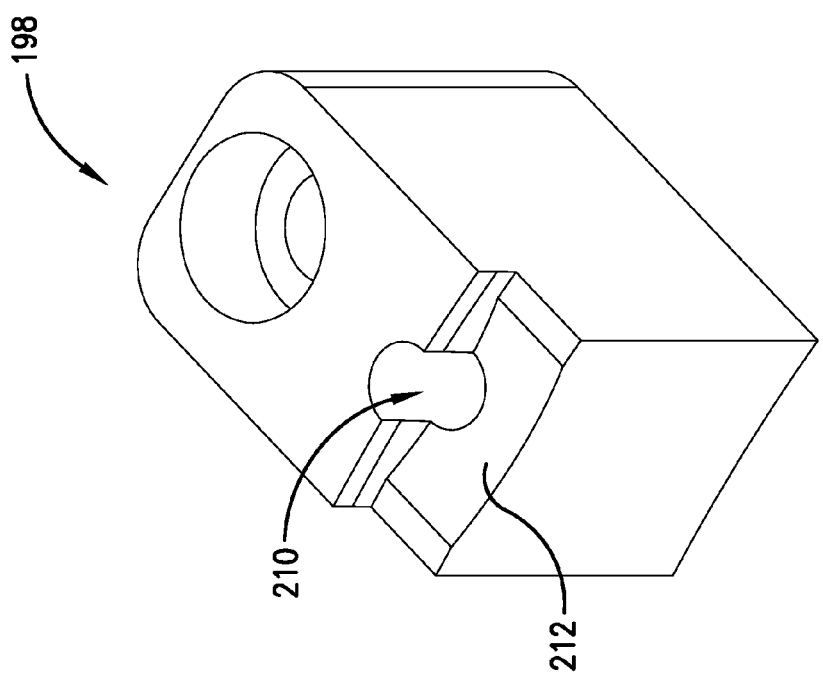

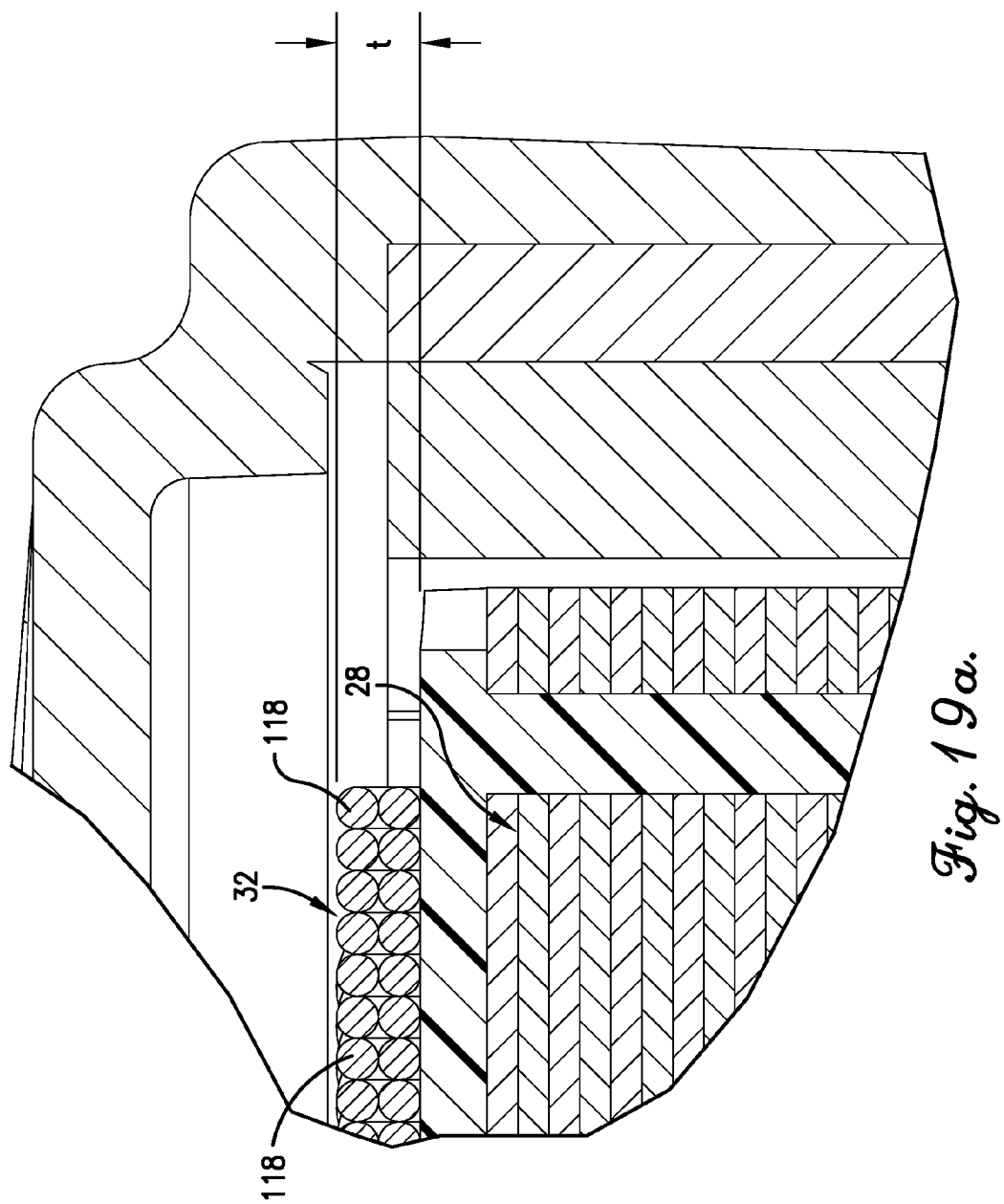

| Speed (RPM) | Torque (N-m) | Power (W) | Efficiency |
| --- | --- | --- | --- |
| 70.0 | 0.100 | 1.43 | 51.3% |
| 96.0 | 0.200 | 3.27 | 61.4% |
| 122.0 | 0.330 | 6.21 | 67.8% |
| 149.0 | 0.470 | 10.50 | 69.8% |
| 169.0 | 0.610 | 15.11 | 71.5% |
| 180.0 | 0.720 | 18.92 | 71.7% |
| 193.0 | 0.860 | 24.51 | 70.9% |
| 201.0 | 1.000 | 29.56 | 71.2% |

FAN MOTOR POWER SUPPLY

CROSS-REFERENCE TO RELATED APPLICATIONS

The present application claims priority from U.S. Provisional Patent Application No. 62/019,357, filed Jun. 30, 2014 ("the '357 provisional application"), the entire disclosure of which is hereby incorporated by reference herein.

Furthermore, the '357 provisional application was filed contemporaneously with U.S. Provisional Patent Application No. 62/019,352, U.S. Provisional Patent Application No. 62/019,354, and U.S. Provisional Patent Application No. 62/019,356, the entire disclosures of each of which are hereby incorporated by reference herein. Yet further, the present application is being filed contemporaneously with non-provisional applications claiming priority from respective ones of the aforementioned provisional applications.

BACKGROUND OF THE INVENTION

1. Field of the Invention

The present invention relates generally to a high efficiency power supply design for fans, especially residential fans.

2. Discussion of the Prior Art

Those of ordinary skill in the art will appreciate that a fan motor must be driven at a certain minimum voltage, but other circuitry within a fan may not require such high voltage for operation. Currently, all fan motor circuitry is provided with the same voltage required to drive the fan: approximately 12-24 volts. Running drivers, level shifters, and microcontrollers at this high voltage often leads to switching losses in the motor circuitry, decreasing the fan's efficiency.

SUMMARY

According to one aspect of the present invention, a fan is provided. The fan comprises at least one fan blade; a fan motor configured to rotate the fan blade; a motor control electrically coupled with the fan motor and configured to control operational characteristics of the fan motor; and a power supply comprising at least one of a step-down high efficiency buck converter, a step-down low drop-out linear regulator, and a step-down switching regulator. The power supply is configured to receive a first input voltage and lower the first input voltage to a second lower voltage. The fan motor is electrically coupled to be driven by the first input voltage and the motor control is electrically coupled to operate using the second lower voltage from the power supply.

According to another aspect of the present invention, a fan is provided. The fan comprises at least one fan blade; a fan motor configured to rotate the fan blade; a motor control comprising a microcontroller, level shifters electrically coupled to the microcontroller, and drivers electrically coupled to the level shifters and configured to drive the fan motor; and a power supply comprising a step-down high efficiency buck converter. The drivers are configured to receive a first input voltage for driving the fan motor. The step-down high efficiency buck converter is configured to receive the first input voltage and to decrease the first input voltage to a second lower voltage. The step-down high efficiency buck converter is configured to output the second lower voltage to the level shifters.

According to another aspect of the present invention, a fan motor control is provided. The fan motor control is configured for driving a three phase wye-connected brushless DC permanent magnet fan motor. The fan motor control comprises a microcontroller configured for providing operational commands for the fan motor, three motor phase level shifters electrically coupled to the microcontroller, three MOSFET drivers electrically coupled to the level shifters and configured to drive the fan motor, and a power supply comprising a step-down high efficiency buck converter. The drivers are configured to receive a first input voltage for driving the fan motor. The step-down high efficiency buck converter is configured to receive the first input voltage and to decrease the first input voltage to a second lower voltage. The step-down high efficiency buck converter is configured to output the second lower voltage to the level shifters.

This summary is provided to introduce a selection of concepts in a simplified form. These concepts are further described below in the detailed description of the preferred embodiments.

This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein:

Figure 12:
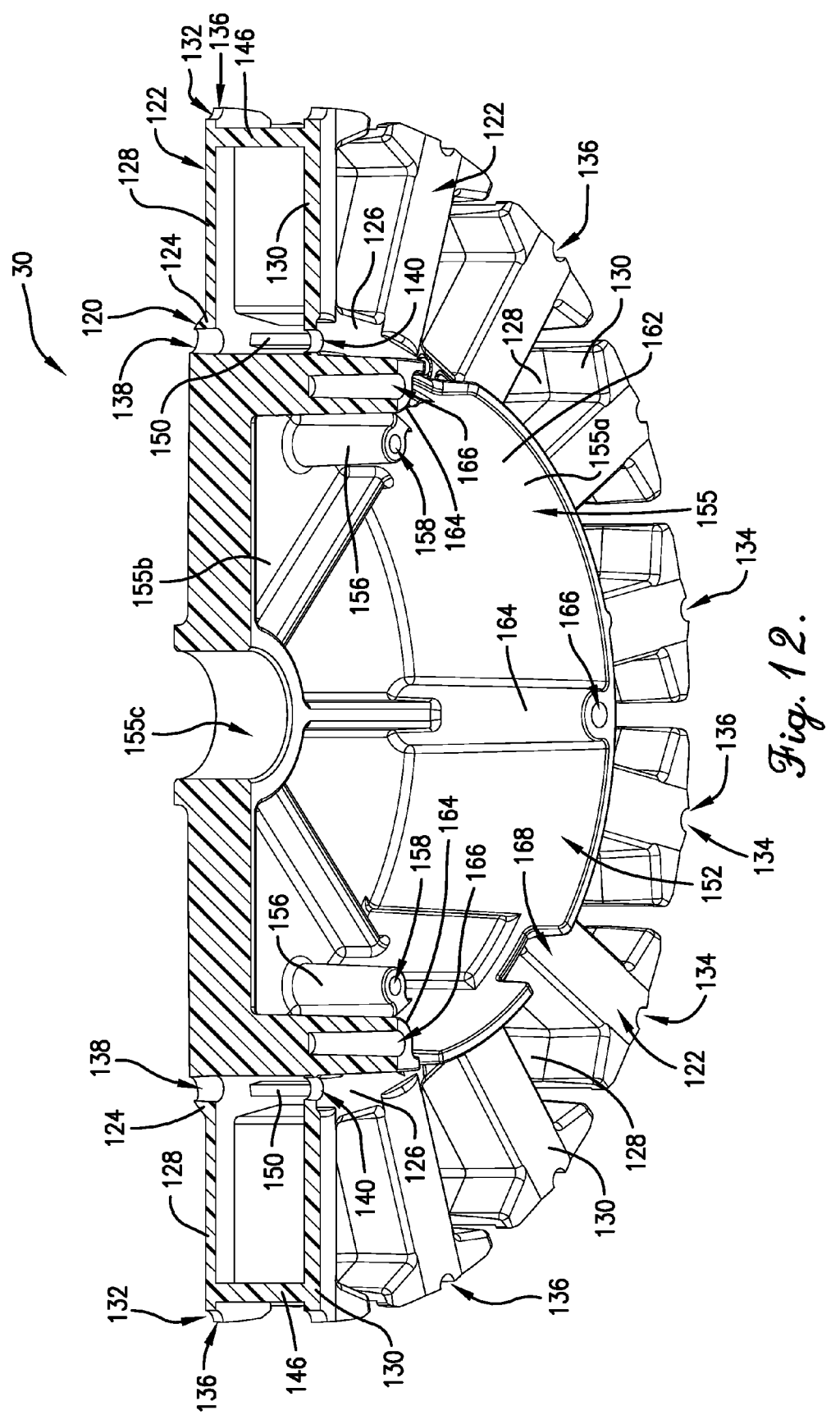

FIG. 12 is an enlarged, fragmentary cross-sectional bottom perspective view of the covering of FIGS. 8-11;

FIG. 14 is a top perspective view of a pin block of the mold of FIGS. 5-8;

FIG. 15 is a bottom perspective view of the pin block of FIG. 14;

FIG. 19a is an enlarged, fragmentary cross-sectional side view of a portion of the motor as shown in FIG. 19, particularly illustrating the axial height of one of the coils;

FIG. 23 is a table providing test data for a motor suitable for use in the preferred fan embodiment of the present invention.

Figure 1:
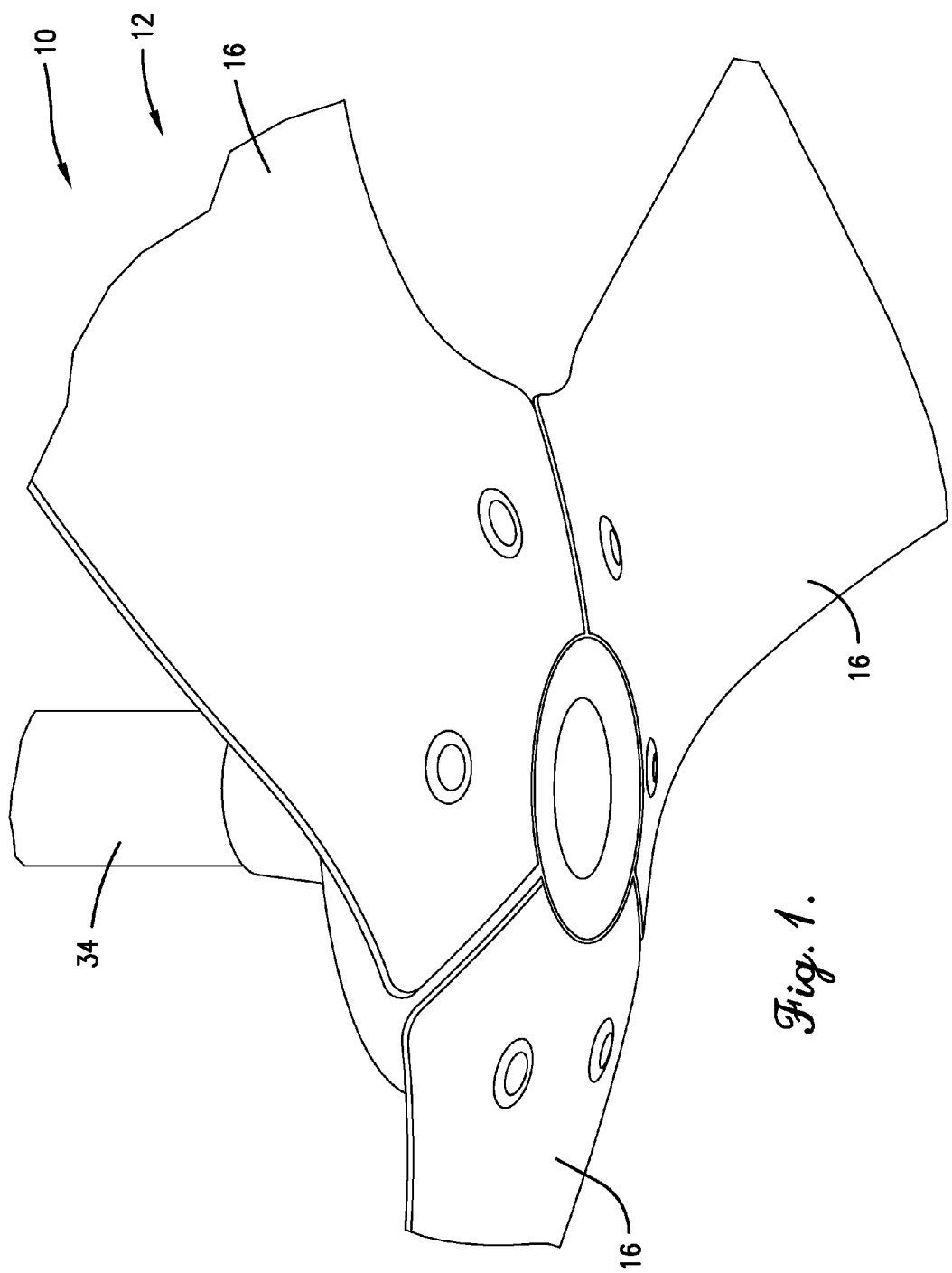
FIG. 1 is a bottom perspective view of an electric fan constructed in accordance with a first preferred embodiment of the present invention.

The drawing figures do not limit the present invention to the specific embodiments disclosed and described herein. The drawings are not necessarily to scale, emphasis instead being placed upon clearly illustrating the principles of the preferred embodiments.

Furthermore, directional references (e.g., top, bottom, front, back, up, down, etc.) are used herein solely for the sake of convenience and should be understood only in relation to each other. For instance, a component might in practice be oriented such that faces referred to as "top" and "bottom" are sideways, angled, inverted, etc. relative to the chosen frame of reference.

It is also noted that, as used herein, the terms axial, axially, and variations thereof mean the defined element has at least some directional component along or parallel to the axis. These terms should not be limited to mean that the element extends only or purely along or parallel to the axis. For example, the element may be oriented at a forty-five degree (45°) angle relative to the axis but, because the element extends at least in part along the axis, it should still be considered axial. Similarly, the terms radial, radially, and variations thereof shall be interpreted to mean the element has at least some directional component in the radial direction relative to the axis.

It is further noted that the term annular shall be interpreted to mean that the referenced object extends around a central opening so as to be generally toroidal or ring-shaped. It is not necessary for the object to be circular, nor does the object have to be continuous. Similarly, the term toroidal shall not be interpreted to mean that the object must be circular or continuous.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Fan

With initial reference to FIG. 1, a machine 10 is provided. The machine 10 preferably comprises an electric fan 12. The fan 12 is preferably a ceiling fan for circulating air. Furthermore, the fan 12 is preferably suitable for indoor and/or outdoor use. In a preferred embodiment, both commercial and residential uses are permissible. It is permissible according to some aspects of the present invention, however, for the fan to be of an alternative type or to be intended solely for indoor use, residential use, etc.

The fan 12 preferably includes a motor 14 and plurality of airfoils or blades 16 driven by the motor 14 to cooperatively rotate about an axis. As shown in FIG. 1, the blades 16 are preferably evenly arcuately spaced apart about the axis, although alternative blade arrangements are permissible without departing from the scope of the present invention. In a preferred embodiment, three (3) blades 16 are provided. The blades 16 collectively rotate during operation of the motor 14 to thereby move air.

In a preferred embodiment, the fan 12 is operable at speeds up to approximately two hundred five (205) revolutions per minute (rpm). More particularly, at a low speed setting, the fan 12 preferably operates at about thirty-five (35) rpm. At a high speed setting, the fan 12 preferably operates at about two hundred two (202) rpm. It is permissible, however, for the fan to have a varying operating range and varying low- and high-speed settings.

Preferably, the fan has an outer diameter of at least about one (1.0) meter (m). More preferably, the outer diameter of the fan 12 is approximately one and twenty-five hundredths (1.25) m to approximately one and seventy-five hundredths (1.75) m. Most preferably, the fan outer diameter is about one and five tenths (1.5) m. The tips of the blades 16 preferably cooperatively define the outer diameter. Varying fan sizes are permissible according to some aspects of the present invention, however.

In a preferred embodiment, the fan 12 has an axial height (i.e., a drop) ranging from about two hundred twenty-five (225) millimeters (mm) to about two thousand 2000 mm. Although variations in axial height are permissible according to some aspects of the present invention, it is typically most desirable for the fan 12 to have a low vertical profile.

The fan 12 preferably weighs from about five and five tenths (5.5) kilograms (kg) to about seven and one half (7.5) kg. However, variations in weight are permissible according to some aspects of the present invention.

The fan 12 preferably operates off of one hundred to two hundred forty (100-240) volts alternating current (VAC) at fifty to sixty (50-60) Hertz (Hz). Most preferably, the fan 12 includes a converter (250) that converts the one hundred to two hundred forty (100-240) VAC to twelve to twenty-four (12-24) volts direct current (VDC).

At high speed, the fan 12 preferably generates from about four thousand (4,000) cubic feet per minute (CFM) of airflow to about five thousand, five hundred (5,500) CFM. Most preferably, the fan generates about five thousand, three hundred fifty (5,350) CFM of airflow at high speed. Greater or lesser air moving capabilities are permissible according to some aspects of the present invention, however.

The fan 12 may suitably incorporate a variety of sensors, including but not limited to infrared motion sensors, ambient light sensors, and environmental sensors (e.g., temperature and humidity sensors). A wireless Internet chip might be embedded, and/or a predictive learning microprocessor might be included.

The motor 14 preferably includes a stator 18 and a rotor 20 rotatable relative to the stator 18 about the axis. As will be discussed in greater detail below, portions of the rotor 20 preferably at least substantially circumscribe the stator 18, such that the motor 14 is an outer rotor motor. It is permissible according to some aspects of the present invention, however, for an inner rotor motor, a dual rotor motor, or an otherwise alternatively configured motor to be used.

In a preferred embodiment, the motor 14 defines at least ten (10) poles. More preferably, the motor 14 defines sixteen (16) to twenty-four (24) poles. Most preferably, the motor 14 defines twenty (20) poles.

In a preferred embodiment, the motor 14 preferably has a nine (9) slot to ten (10) pole ratio. Most preferably, the motor has eighteen (18) slots and twenty (20) poles. However, it is permissible according to some aspects of the present invention for an alternative slot-to-pole ratio to be provided (e.g., in association with one of the permissible alternative numbers of poles discussed above).

As will be discussed in greater detail below, the rotor 20 preferably includes a rotor can 22, a backing ring 24 fixed relative to the can 22, and a plurality of arcuately arranged magnets 26 fixed relative to the can 22 and the backing ring 24.

As will be discussed in greater detail below, the stator 18 preferably includes a core 28, an electrically insulative covering 30 formed about the core 28, and a plurality of coils 32 wound about the core 28. It is permissible according to some aspects of the present invention, however, for alternatively configured insulation or even no insulation to be provided. For instance, according to some aspects of the present invention, the stator core 28 might alternatively be provided with electrically insulative powder-coating.

The motor 14 also preferably includes a shaft 34 on which the rotor 20 is rotatably supported by a bearing assembly 36. The bearing assembly 36 may be of any type suitable for the particular application. In a preferred embodiment, as illustrated, the bearing assembly 36 includes a pair of ball bearings 38.

The rotor 20 is preferably rotatable about an axis at least in part defined by the shaft 34. However, an alternative rotation axis is permissible according to some aspects of the present invention. For instance, the rotation axis might at least in part be parallel to but radially offset from the shaft axis.

For clarity and brevity, the direction of the shaft 34 extension relative to the remainder of the motor 14 will be described as being upward. Other directional references used herein will be based on this frame of reference. As noted previously, however, directional references used herein should understood only in relation to each other and are not necessarily applicable relative to the broader environment in which the invention is operable.

Rotor

The rotor can 22 preferably includes a generally radially extending base plate 40 and a sidewall 42 extending axially from the base plate 40 and arcuately about the axis. The illustrated sidewall 42 is continuous and circular in shape. However, with respect to certain aspects of the present invention, the sidewall can alternatively comprise spaced apart segments or have alternative shapes (although symmetry about the rotor axis is preferred). Furthermore, the sidewall may alternatively extend at a different angle from the base plate. Those of ordinary skill in the art will appreciate that the base plate may similarly be alternatively configured without departing from the spirit of the present invention. Preferably, the sidewall 42 extends at least generally upwardly from the base plate 40.

As will be discussed in greater detail below, the backing ring 24 is preferably fixed relative to the sidewall 42, while the magnets 26 are fixed relative to the backing ring 24. Furthermore, in a preferred outer rotor motor embodiment, the backing ring 24 is at least substantially positioned radially inwardly relative to the sidewall 42, while the magnets 26 are at least substantially positioned radially inwardly relative to the backing ring 24.

Figure 2:
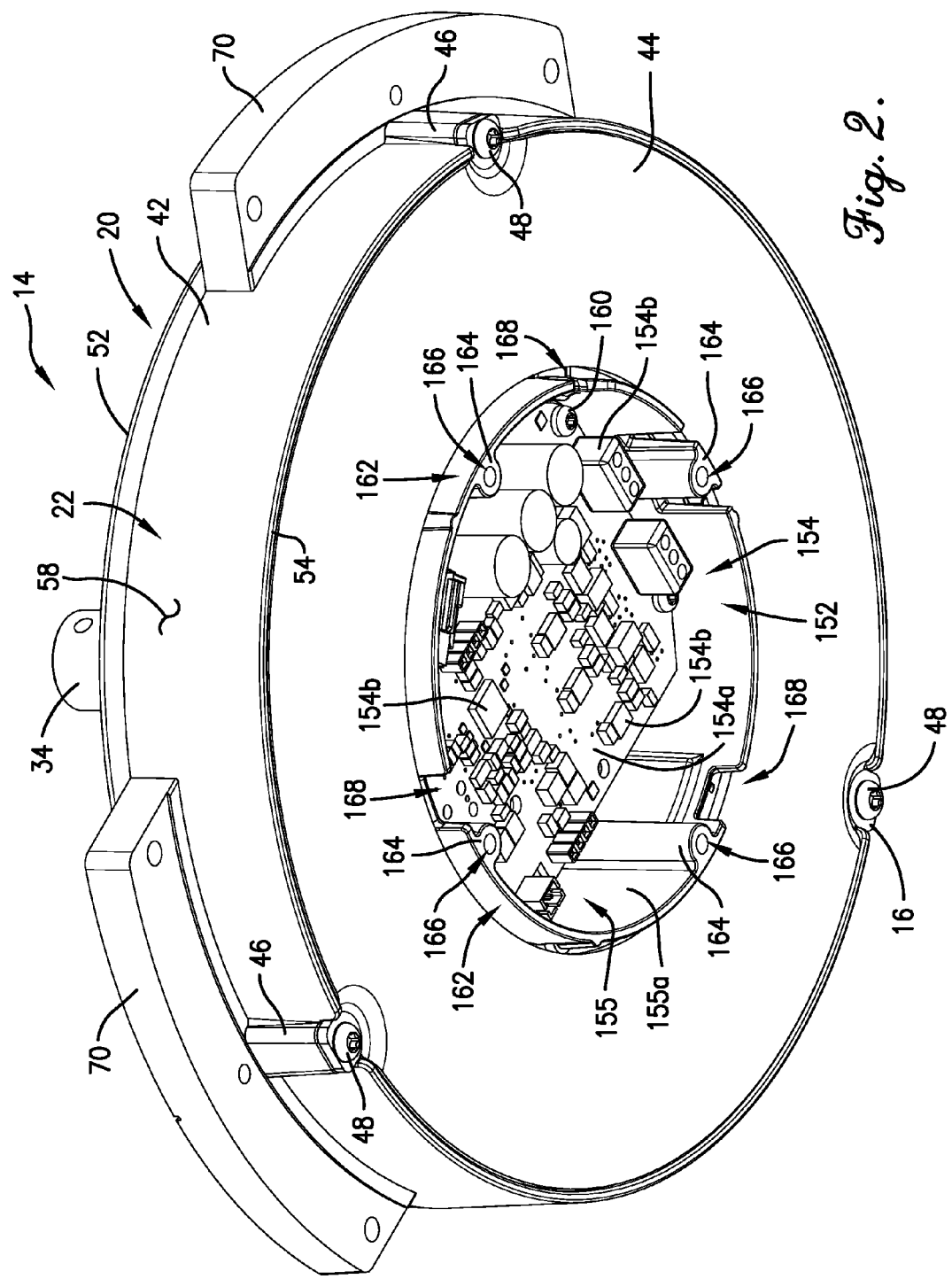
FIG. 2 is a bottom perspective view of the motor of the fan of FIG. 1.
Figure 4:
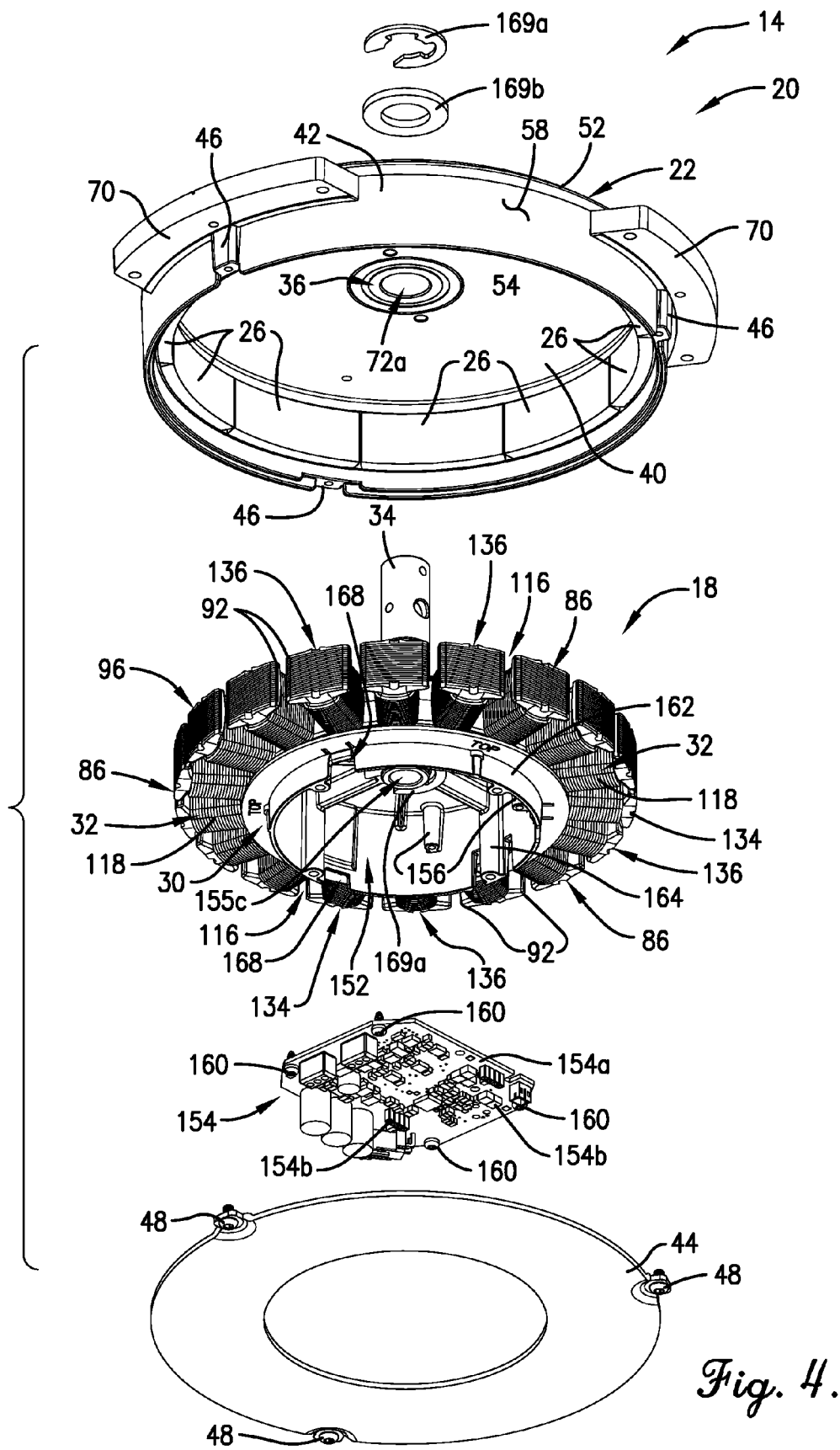
FIG. 4 is an exploded bottom perspective view of the motor of FIGS. 2 and 3.

As best shown in FIGS. 2 and 4, the rotor 20 preferably further includes a stator cover 44 that is preferably attached to the can 22 via stator cover bosses 46 and stator cover fasteners 48. It is permissible, however, for the stator cover to be omitted or to be attached by alternative means, such as adhesives and/or latches.

Figure 19:
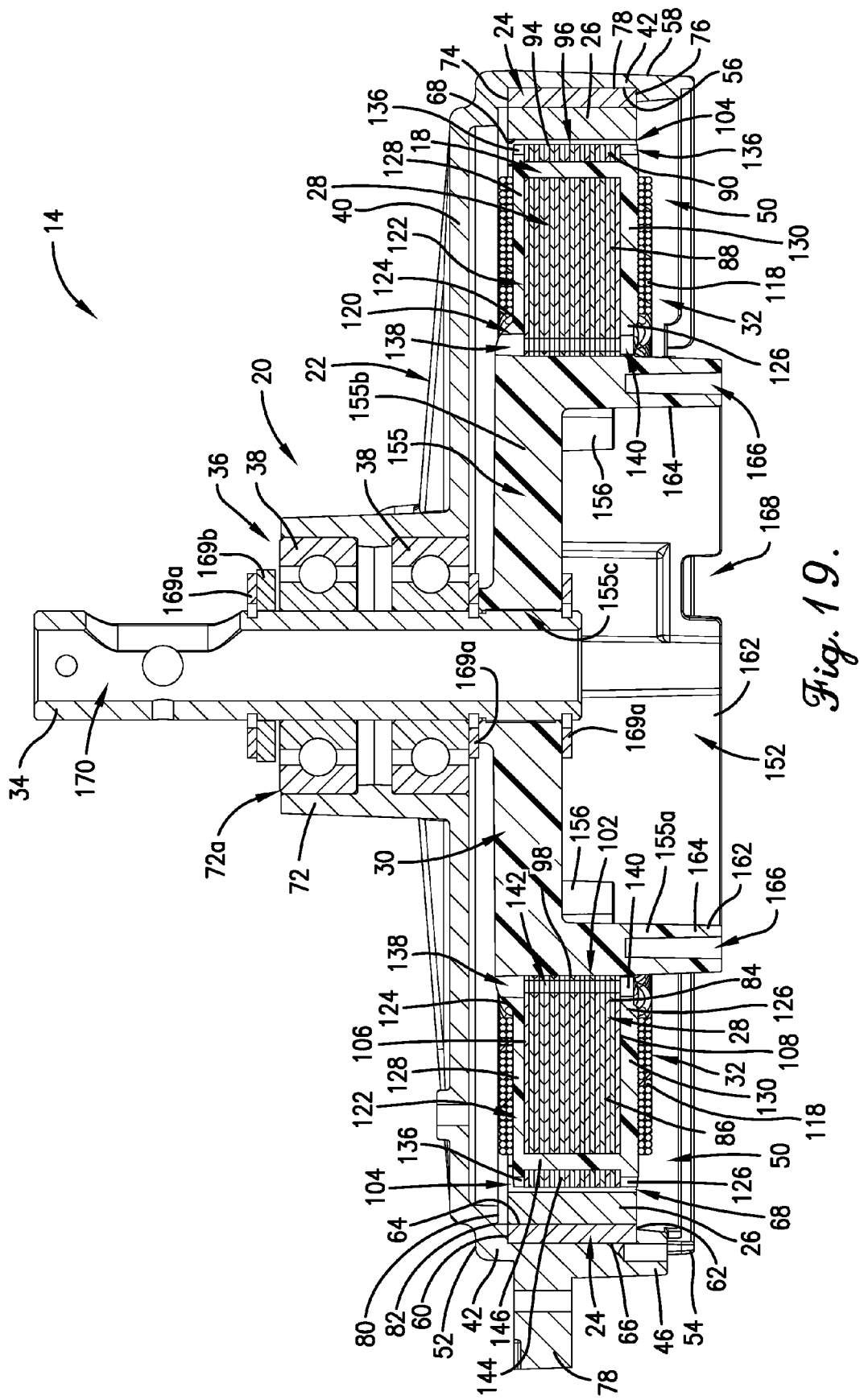
FIG. 19 is a cross-sectional side view taken along line 19-19 of FIG. 18.

As best shown in FIG. 19, the stator cover 44, the can 22, and the magnets 26 preferably cooperatively in part define a generally cylindrical stator compartment 50. The stator 18 is at least substantially received in the stator compartment 50.

The sidewall 42 preferably defines axially spaced apart upper and lower margins 52 and 54. The upper margin 52 is preferably adjacent the base plate 40, while the lower margin 54 preferably defines the lowermost edge of the can 22.

The upper margin 52 and the lower margin 54 are preferably spaced apart a distance that may be referred to as the axial height of the sidewall 42. The axial height of the sidewall 42 is preferably less than about forty-five (45) mm. More preferably, the axial height of the sidewall 42 is from approximately thirty (30) mm to approximately forty (40) mm. Most preferably, the axial height of the sidewall 42 is about thirty-five (35) mm.

In a preferred embodiment, the axial height of the stator compartment 50 is at least substantially equal to the axial height of the sidewall 42.

The backing ring 24 and the rotor can 22 are preferably generally annular or toroidal in shape, respectively, while the sidewall 42 preferably extends at least substantially arcuately to have an at least substantially toroidal shape. More preferably, the backing ring 24 and the rotor can 22 are preferably circular in shape, with the sidewall 42 extending at least substantially circumferentially.

As noted previously, the sidewall 42 preferably extends at least substantially continuously and most preferably extends entirely continuously. It is permissible according to some aspects of the present invention, however, for the sidewall to be segmented, perforated, or otherwise discontinuous.

The can 22 preferably has an outer diameter defined by the sidewall 42. More particularly, the sidewall 42 preferably defines an inner sidewall face 56 and an outer sidewall face 58. The outer sidewall face 58 defines the outer diameter of the can 22. The outer diameter of the can 22 (and thus the sidewall 42) is preferably less than about two hundred fifty (250) mm. More preferably, the outer diameter of the can 22 (and thus the sidewall 42) is from approximately one hundred sixty (160) mm to approximately two hundred (200) mm. Most preferably, the outer diameter of the can 22 (and thus the sidewall 42) is about one hundred eighty-five (185) mm.

The inner sidewall face 56 and the outer sidewall face 58 are preferably parallel and preferably both extend at least substantially axially. It is permissible according to some aspects of the present invention, however, for the faces to be non-parallel and/or non-axially extending.

Figure 16:
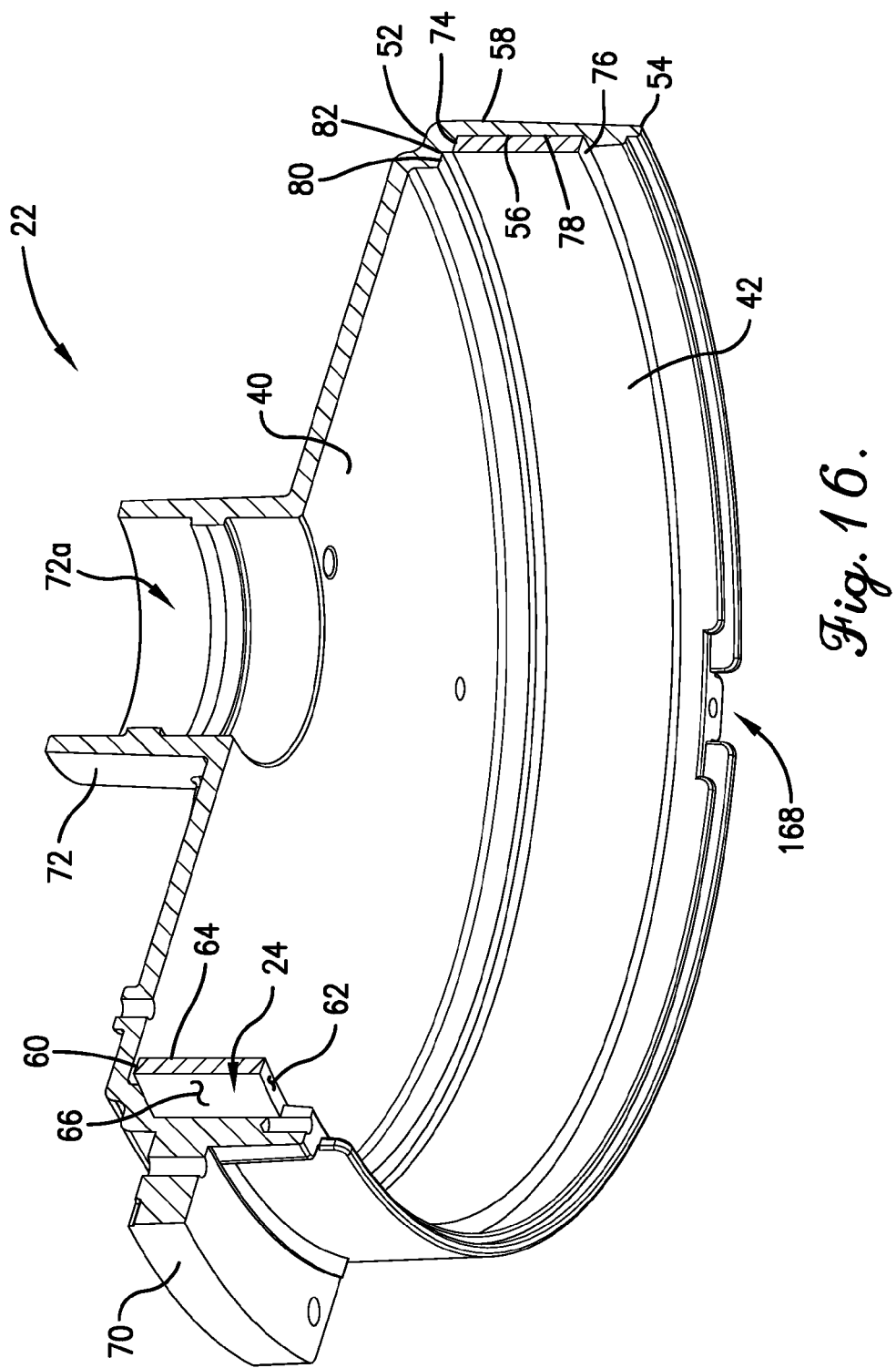
FIG. 16 is bottom perspective view of the rotor can of the motor of FIGS. 2-4.

As shown in FIG. 16 and others, the backing ring 24 preferably defines a pair of axially spaced apart upper and lower backing ring faces 60 and 62 (i.e., a pair of end faces), respectively, that project at least generally outwardly relative to the axis. Furthermore, the backing ring 24 preferably defines an inner backing ring face 64 and an outer backing ring face 66 (i.e., a pair of side faces).

The inner and outer backing ring faces 64 and 66 are preferably radially spaced apart and generally oppositely directed. The inner and outer backing ring faces 64 and 66 also preferably extend axially from and interconnect the upper and lower backing ring faces 60 and 62. In a preferred embodiment, the upper and lower backing ring faces 60 and 62 are preferably planar, parallel with each other, and at least substantially orthogonal to the axis. The upper and lower backing ring faces 60 and 62 therefore are not only non-parallel with the inner and outer backing ring faces 64 and 66, but also at least substantially orthogonal thereto. It is permissible according to some aspects of the present invention, however, for the faces of the backing ring to be alternatively oriented relative to each other.

As noted previously and as best shown in FIGS. 4 and 19, the magnets 26 are preferably evenly arcuately arranged and are fixed relative to the backing ring 24. It is permissible, however, for the magnets to be unevenly and/or non-arcuately arranged.

In a preferred embodiment, the magnets 26 are fixed to one of the inner and outer backing ring faces 64 and 66. As noted above, the motor 14 is most preferably an outer rotor motor, with the magnets 26 being mounted to the inner backing ring face 64 and with the backing ring 24 and the magnets 26 at least substantially circumscribing the stator 18.

The magnets 26 are preferably adhered to the backing ring 24, although any one or more of a variety of mounting means may be used without departing from the scope of the present invention.

In a preferred embodiment, ten (10) magnets 26 are provided and configured in such a manner that the motor has (20) poles. It is permissible according to some aspects of the present invention, however, for more or fewer magnets to be provided.

Each magnet 26 preferably has a radial depth from about three (3) mm to about seven (7) mm and an arcuate length from about eighteen (18) mm to about twenty-two (22) mm. Most preferably, each magnet 26 has a radial depth of about five (5) mm and a radial length of about twenty (20) mm.

The magnets 26 preferably cooperatively define a rotor inner margin 68. The rotor inner margin 28 preferably defines a inner diameter of the rotor 20 that is less than about two hundred (200) mm. More preferably, the inner diameter of the rotor 20 is from about one hundred sixty (160) mm to about one hundred seventy-five (175) mm. Most preferably, the inner diameter of the rotor 20 is approximately one hundred sixty-four (164) mm.

The magnets 26 also cooperate with the stator 18 to define the air gap for the motor, as will be described in greater detail below.

The magnets 26 are preferably permanent magnets. More preferably, the magnets 26 are ferrite permanent magnets. Most preferably, the magnets 26 are grade six (6) ferrite permanent magnets. It is permissible according to some aspects of the present invention, however, for the magnet type to vary.

In a preferred embodiment, the blades 16 are mounted to the can 22. More particularly, the can 22 preferably includes a plurality of mounting flanges 70 on which the blades 16 are mounted. Preferably, the number of mounting flanges 70 is equal to the number of blades 16. Most preferably, therefore, three (3) mounting flanges 70 are provided.

The mounting flanges 70 each preferably extend generally radially outwardly from the sidewall 42. Furthermore, the mounting flanges 70 are preferably evenly arcuately spaced apart.

The can 22 preferably includes a bearing housing 72 that defines a bearing pocket 72a that at least in part receives the bearings 38 of the bearing assembly 36. The pocket 72a and the backing ring 24 are preferably at least substantially concentric.

Furthermore, the can 22, the backing ring 24, the magnets 26, and the blades 16 are preferably collectively at least substantially rotationally symmetrical and at least substantially rotationally balanced.

In a preferred embodiment, the can 22 is diecast of a metal material, with the base plate 40, the sidewall 42, and the mounting flanges 70 being integrally formed. It is permissible according to some aspects of the present invention, however, for the can to be alternatively formed or to comprise one or more alternative materials. The can might be molded and/or machined, for instance, or comprise plastic.

Again, the sidewall 42 is preferably diecast integrally as part of the can 22. Furthermore, sidewall 42 is preferably non-machined (e.g., no machining occurs to the sidewall after it is cast in the diecasting process).

The can 22 is preferably diecast in an overlying relationship with at least part of the backing ring 24, with the sidewall 42 and the backing ring 24 thereby being securely interengaged so as to restrict relative shifting therebetween. Preferably, the motor 14 is devoid of fasteners, adhesives, welds, or other means for interconnecting the backing ring 24 and the can 22. That is, the backing ring 24 is secured in the can 22 only as a result of the diecasting process.

Figure 17:
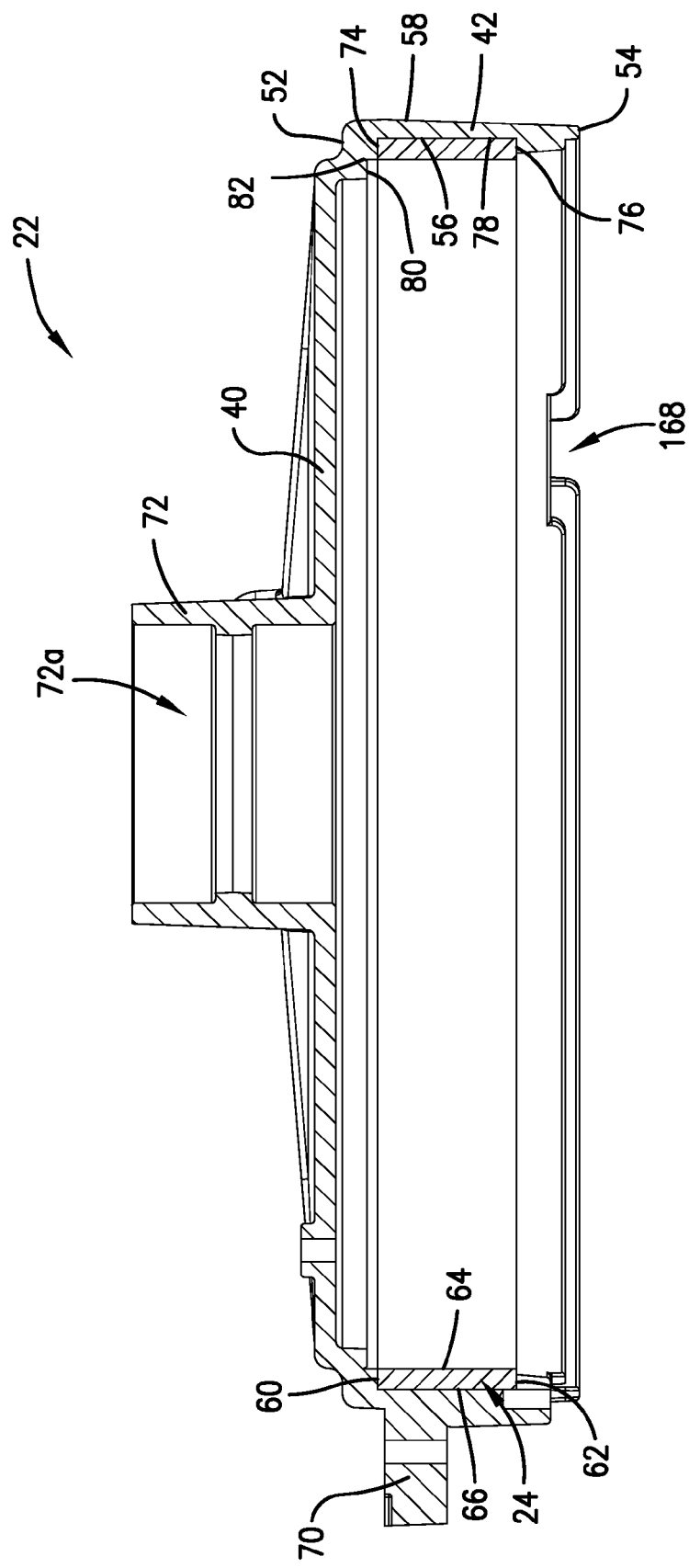
FIG. 17 is a cross-sectional side view of the rotor can of FIG. 16.

More particularly, as best shown in FIGS. 16, 17, and 19, the sidewall 42 preferably includes an upper non-machined, diecast shoulder portion 74 and a lower non-machined, diecast shoulder portion 76 spaced axially from the upper shoulder portion 74. The upper shoulder portion 74 preferably abuts the upper backing ring face 60, while the lower shoulder portion 76 preferably abuts the lower backing ring face 62. The shoulder portions 74 and 76 thereby axially capture the backing ring 24 therebetween.

The sidewall 42 also preferably includes anon-machined, diecast axial portion 78 that extends between the shoulder portions 74 and 76 and abuts one of the inner and outer backing ring faces 64 and 66. In the preferred outer rotor embodiment of the motor 14, the axial portion 78 abuts the outer backing ring face 66 and is defined by the inner sidewall face 56.

Preferably, the one of the inner and outer backing ring faces 64 and 66 that abuttingly engages the sidewall 42 (and does not support the magnets 26) is devoid of machining. The other of the inner and outer backing ring faces 64 and 66, however, may be machined if desired. More particularly, in a preferred embodiment, the outer backing ring face 66 is non-machined, while the inner backing ring face 64 is machined.

The sidewall 42 further preferably includes an inner shoulder portion 80 spaced radially inwardly and axially upwardly from the upper shoulder portion 74. The inner shoulder portion 80 is preferably machined after diecasting of the can 22, although it is permissible for the inner shoulder portion to alternatively be non-machined.

As best shown in FIGS. 17 and 19, an annular groove 82 is preferably formed between the upper and inner shoulders 74 and 80, respectively. The groove 82 enables the elimination of a radius that would otherwise be formed between the upper shoulder 74 and the inner shoulder 80. In some cases, the groove 82 may also receive excess glue from the magnet adhesion process.

In a preferred embodiment, the can 22 comprises aluminum. It is permissible according to some aspects of the present invention, however, for the can to comprise one or more alternative materials, although such materials are limited in cases in which the preferred diecasting process is used. If the can is instead molded, for instance, plastic might be used.

In the case of a diecast can 22, it is noted that it is particularly important that the backing ring 24 have a sufficient radial thickness (i.e., the radial distance between the inner and outer backing ring faces 64 and 66) to withstand the heat associated with the diecasting process without problematic degrees of expansion and/or other forms of deformation. For instance, the heat of the molten aluminum of the can 22 in a preferred diecasting process necessitates that the backing ring 24 have a radial thickness of approximately two (2) mm to approximately four (4) mm. Most preferably, the backing ring 24 has a radial thickness of about three (3) mm.

The can 22 and the backing ring 24 preferably comprise dissimilar materials. More particularly, as noted above, the can 22 preferably comprises aluminum, while the backing ring 24 preferably comprises steel or any other suitable magnetic material.

Those of ordinary skill in the art will recognize that the above-described diecasting approach to securing of the backing ring 24 in the rotor can 22 is highly advantageous, enabling secondary machining and pressing operations conventionally necessary for insertion of a backing ring into a can (e.g., machining of the sidewall of the can and the outer face of the backing ring, followed by pressing of the backing ring into the machined opening) to be eliminated without loss of the concentricity of the backing ring 24 and the bearing pocket 72a. Among other things, such concentricity is necessary for balance, radial uniformity of the air gap (to be discussed in greater detail below) between the rotor 20 and the stator 18, optimal sound response, and motor performance in general.

It is also particularly noted that the principles of diecasting a backing ring into a rotor can are applicable to motors in a variety of applications distinct from electric fans. Among other things, for instance, a diecast rotor can as described above could suitably be used in appliances such as washing machines or in exercise equipment such as electric bicycles or bicycle generators.

Stator

As noted previously, the motor 14 preferably includes a stator 18 and a rotor 20. As also noted previously, the stator 18 is preferably an insulated stator and includes a core 28, an electrically insulative covering 30 formed on the core 28, and a plurality of coils 32 wound about the core 28.

In a preferred embodiment, the stator 18 is preferably generally toroidal in form. The core 28 is likewise preferably generally toroidal in form and defines an axis of the stator 18. Preferably, the axis of the stator 18 is coaxial with that of the rotor 20. However, it is permissible according to some aspects of the present invention for the axes to be non-coaxial.

As noted previously and as best shown in FIGS. 18 and 19, the stator 18 is preferably at least substantially received in the stator compartment 50.

The core 28 preferably includes an annular yoke 84 and a plurality of arcuately spaced apart teeth 86 extending at least generally radially from the yoke 84. Preferably, the teeth 86 extend radially outwardly from the yoke 84 (because of the preferred outer rotor motor design), although it is permissible according to some aspects of the present invention for the teeth to extend generally inwardly.

Each tooth 86 preferably includes a generally radially extending arm 88 and a generally arcuately extending crown 90 extending from one end of the arm 88. Each crown 90 preferably defines a pair of arcuately spaced apart tips 92. The tips 92 are preferably spaced apart by an arcuate distance of between about two (2) mm and about five (5) mm. Most preferably, the tips 92 are spaced apart about three and five tenths (3.5) mm.

Each crown 90 further preferably presents a circumferential crown face 94 spaced opposite the yoke 84. The circumferential crown faces 94 preferably cooperatively define a first radial margin 96 of the core 28. Again, because the illustrated motor 14 has an outer rotor design, the circumferential crown faces 94 are preferably outer circumferential faces, such that the first radial margin 96 is a radially outermost margin.

The yoke 84 preferably presents an inner circumferential yoke face 98 and an outer circumferential yoke face 100. One of the inner and outer circumferential yoke faces 98 and 100 preferably defines a second radial margin 102 of the core 28. Preferably, the inner circumferential yoke face 98 defines the second radial margin 102 of the core 28, such that the second radial margin 102 is a radially innermost margin. In such an embodiment, it will be readily apparent of one of ordinary skill in the art that the outer circumferential yoke face 100 is discontinuous due to the teeth 86 extending therefrom.

The core 28 preferably has an outer diameter defined by the first radial margin 96. The outer diameter of the core 28 is preferably less than about two hundred (200) mm. More preferably, the outer diameter of the core 28 is from approximately one hundred sixty (160) mm to approximately one hundred seventy-five (175) mm. Most preferably, the outer diameter of the core 28 is approximately one hundred sixty-two and five tenths (162.5) mm. As will be further described, the covering 30 does not overlie the faces 94 of the teeth 86, and the outer core diameter consequently defines the outer diameter of the illustrated stator 18.

The core 28 preferably has an inner diameter defined by the second radial margin 102. The inner diameter of the core 28 is preferably less than about one hundred thirty (130) mm. More preferably, the inner diameter of the core 28 is from approximately ninety (90) mm to approximately one hundred ten (110) mm. Most preferably, the inner diameter of the core 28 is approximately one ninety-six and five tenths (96.5) mm.

Figure 18:
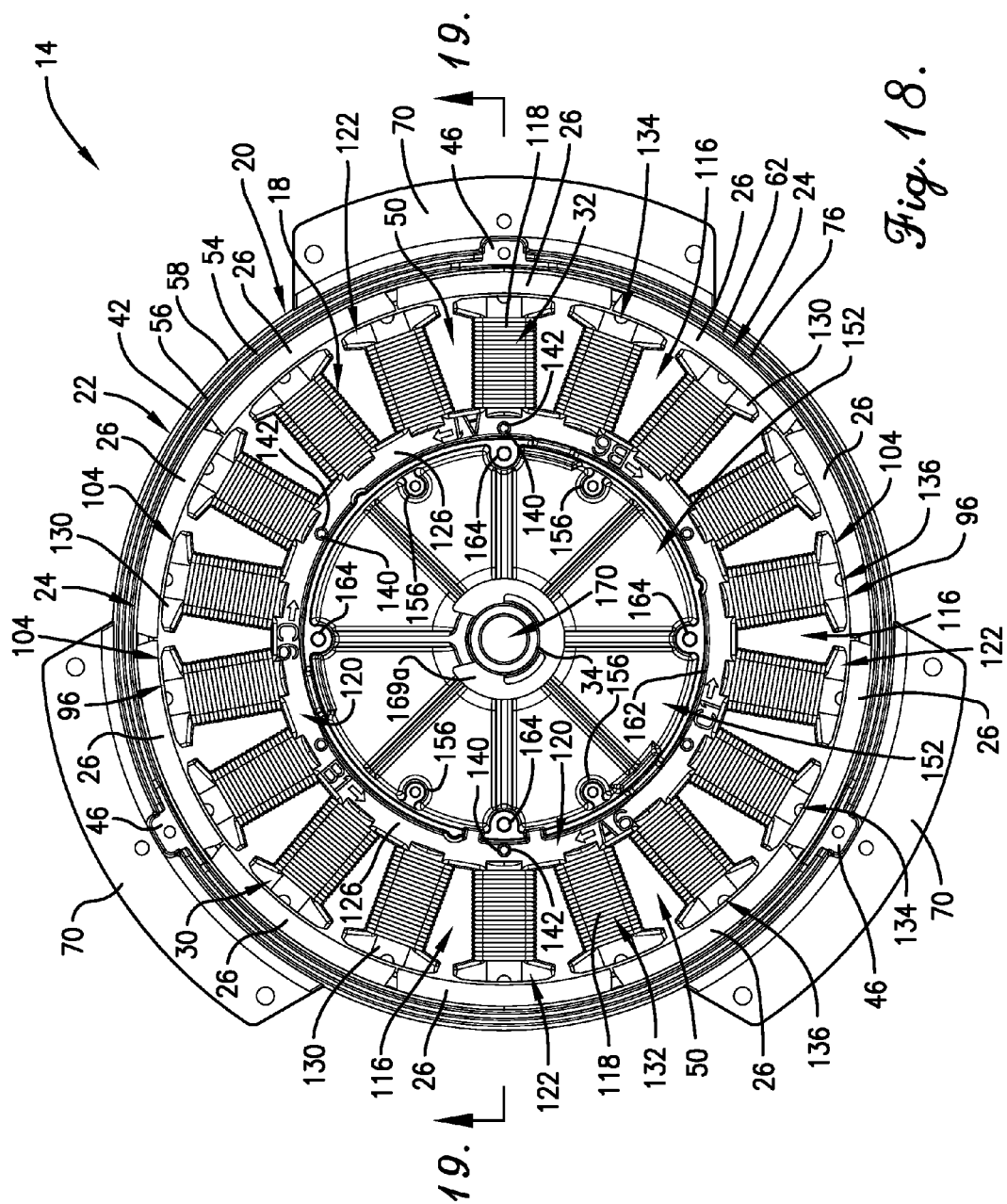
FIG. 18 is a bottom view of a portion of the motor of FIGS. 2-4, particularly illustrating the relative positioning of the rotor and the stator.

As noted previously, the rotor 20 preferably at least substantially circumscribes the stator 18. More particularly, as best shown in FIGS. 18 and 19, each of the magnets 26 is preferably spaced radially outwardly from the first radial margin 96 of the core 28, such that the core 28 and the magnets 26 cooperatively define a circumferentially extending gap 104 therebetween. (That is, the inner diameter of the rotor 20 is preferably slightly larger than the outer diameter of the core 28.)

The gap 104 is preferably about one and five tenths (1.5) mm in radial thickness, in keeping with the aforementioned most preferred rotor 20 inner diameter of about one hundred sixty-four (164) mm and the aforementioned most preferred core 28 outer diameter of about one hundred sixty-two and five tenths (162.5) mm. However, the gap thickness may vary without departing from the scope of some aspects of the present invention.

Preferably, the yoke 84 and the teeth 86 cooperatively further present opposite axial end faces 106 and 108. The end faces 106 and 108 are preferably at least substantially planar and parallel with each other, although non-parallel and/or non-planar surfaces are permissible according to some aspects of the present invention.

The core 28 preferably has an axial height (i.e., a stack height) defined as the axial distance between the end faces 106 and 108. The axial height of the core 28 is preferably less than about twenty-five (25) mm. More preferably, the axial height of the core 28 is from approximately twelve (12) mm to approximately eighteen (18) mm. Most preferably, the core 28 has an axial height of about fifteen (15) mm.

Preferably, the teeth 86 each present a pair of side faces 110 extending between and interconnecting the upper and lower end faces 106 and 108. Each side face 110 projects generally radially between the outer yoke face 100 and the outer circumferential face 94 of the tooth 86. Each side face 110 consequently presents an arm portion 112 and a crown portion 114.

As best shown in FIG. 18, adjacent side faces 110 of each adjacent pair of teeth 86 preferably define a slot 116 therebetween. Preferably, the core 28 includes twenty (20) teeth 86 such that, as noted previously, twenty (20) slots 116 are defined.

The coils 32 preferably comprise electrically conductive wiring 118. The wiring 118 is preferably wound about each of the teeth 86 through the slots 116 to form the coils 32, with each of the coils 32 corresponding to one of the teeth 86.

Each of the coils 32 preferably comprises twenty-five (25) to fifty (50) turns of the wiring 118. More preferably, each of the coils 32 comprises thirty (30) to forty (40) turns of the wiring 118. Most preferably, each coil 118 comprises thirty-one (31) turns of the wiring 118.

The wiring 118 preferably forms as many as three (3) layers. Most preferably, however, and as shown in FIGS. 19 and 19a, the wiring 118 forms two (2) layers.

The wiring 118 preferably comprises copper, although aluminum or any of a variety of electrically conductive materials may be used without departing from the scope of some aspects of the present invention.

The wiring 118 preferably has a gauge from about eighteen (#18.0) to about nineteen and five tenths (#19.5). Most preferably, however, the wire is eighteen and five tenths gauge (#18.5) wire.

Each of the coils 32 preferably has a total axial height of less than about thirty (30) mm. More preferably, each of the coils 32 preferably has an axial height from approximately eighteen (18) mm to approximately twenty-three (23) mm. Most preferably, each of the coils 32 preferably has an axial height of approximately twenty-one (21) mm.

As shown in FIG. 19a, the layers of wiring 118 preferably present an aggregate axial height or coil thickness t of the coils 32 (i.e., an axial height beyond the respective axial end face 106 or 108 of the core 28 and the associated covering 30) of at most about five (5) mm. More preferably, the coils 32 have a thickness t of about one (1) mm to about three (3) mm. Most preferably, the coils 32 have a thickness t of about (1) mm to approximately two (2) mm. Such thickness t is preferably presented cooperatively by two (2) layers of wiring 118, as discussed above, although other numbers of layers may in some embodiments present the overall coil thickness.

In view of the above, it will be readily apparent to one of ordinary skill in the art that the coils 32 add at most about ten (10) mm to the overall stator height, more preferably from about two (2) mm to about six (6) mm to the overall stator height, and most preferably about two (2) mm to about four (4) mm to the overall stator height.

The core 28 is preferably a laminated core. The laminations are preferably about seven hundred eighty seven thousandths (0.787) mm thick. However, it is permissible for the core to be a solid core or to have different lamination thicknesses without departing from the scope of the present invention.

The core 28 preferably comprises steel. More particularly, the core preferably comprises S85H5 steel. However, it is permissible without departing from the scope of some aspects of the present invention for any one or more of a variety of materials to be used for the core.

The covering 30 preferably comprises a synthetic resin material, but any one or more of a variety of substantially electrically insulative materials may be used without departing from the scope of the present invention.

The covering 30 preferably includes a yoke portion 120 covering at least part of the yoke 84 and a plurality of arcuately spaced apart tooth portions 122 each corresponding with and at least in part covering one of the teeth 86. Preferably, the covering 30 includes a tooth portion 122 for each tooth 86. That is, the number of tooth portions 122 and the number of teeth 86 is preferably the same, with each tooth 86 preferably being provided with electrical insulation via the covering 30. It is permissible according to some aspects of the present invention, however, for some of the teeth to not be covered by the covering.

In a preferred embodiment, the upper and lower end faces 106 and 108 of the core 28 are preferably at least substantially covered by the covering 30, both adjacent the teeth 86 and adjacent the yoke 84. The side faces 110 of the teeth 86 and the inner and outer circumferential yoke faces 98 and 100 are also preferably at least substantially covered by the covering 30. Preferably, the side faces 110 and the inner and outer circumferential yoke faces 98 and 100 are entirely covered by the covering 30.

However, the circumferential crown faces 94 of the teeth 86 and thus the first radial margin 96 of the core 28 are at least substantially devoid of the covering 30.

The wiring 118 is preferably wound about the teeth 86 on the outside of the tooth portions 122 of the covering 30, such that the wiring 118 is not in direct contact with the core 28 itself. That is, the covering 30 preferably insulates the core 28 from the wiring 118.

The yoke portion 120 of the covering 30 preferably includes an upper yoke-covering portion 124 and a lower yoke-covering portion 126 spaced axially from the upper yoke-covering portion 124.

Each of the tooth portions 122 of the covering 30 preferably includes an upper tooth-covering portion 128 and a lower tooth-covering portion 130 spaced axially from the upper tooth-covering portion 128.

Each of the upper tooth-covering portions 128 of the covering 30 preferably includes an upper tooth opening 132 extending through the covering 30 to a respective one of the teeth 86 to expose the core 28. Similarly, each of the lower tooth-covering portions 130 preferably includes a lower tooth opening 134 extending through the covering 30 to a respective one of the teeth 86 to further expose the core 28. That is, the tooth 86 is not covered by the covering 30 at the tooth openings 132 and 134.

The upper and lower tooth openings 132 and 134 preferably form aligned pairs and are preferably defined along respective ones of the upper and lower end faces 106 and 108 of the core 28 adjacent the teeth 86. It is permissible according to some aspects of the present invention, however, for the tooth openings to be non-aligned, non-paired, and/or alternatively positioned. For instance, each tooth portion might define only one of the upper and lower tooth openings rather than a pair, as preferred. Yet further, some of the tooth portions might be entirely devoid of tooth openings.

Regardless of whether all or only some of the tooth portions include tooth openings and regardless of whether each tooth portion that includes an a tooth opening includes both upper and lower tooth openings (rather than just one opening), it is preferred that the tooth openings be arranged rotationally symmetrically. For instance, every other tooth might include both upper and lower tooth openings, or only upper tooth openings might be found on a first set of teeth that are arcuately offset by one tooth from a second set of teeth on which only lower tooth openings are found. Irregular spacing is permissible according to some aspects of the present invention.

In a preferred embodiment, the upper and lower tooth openings 132 and 134, respectively, are positioned at least substantially adjacent the first radial margin 96 of the core 28. Alternative positioning is permissible according to some aspects of the present invention, however.

Furthermore, each of the upper and lower tooth openings 132 and 134 preferably comprises a notch 136. The notch 136 preferably takes a generally semicircular shape. It is within the ambit of the present invention, however, for the upper and lower tooth openings to be in an alternate form or for the notch to be of another shape, such as triangular or rectangular.

In a preferred embodiment, the yoke portion 120 of the covering 30 defines upper and lower sets of yoke holes 138 and 140, respectively, extending through the covering 30 such that a portion of the core 28 is exposed at the yoke holes 138 and 140. The upper yoke holes 138 are preferably defined by the upper yoke-covering portion 124 along the upper end face 106 of the core 28, while the lower yoke holes 140 are preferably defined by the lower yoke-covering portion 126 along the lower end face 108 of the core 28.

The upper yoke holes 138 are preferably evenly arcuately spaced apart, and the lower yoke holes 140 are likewise preferably evenly arcuately spaced apart. Furthermore, the upper yoke holes 138 are preferably aligned with corresponding ones of the lower yoke holes 140.

In a preferred embodiment, six (6) upper yoke holes 138 and six (6) lower yoke holes 140 are provided.

Preferably, the yoke 84 defines a plurality of yoke openings 142, each of which is aligned with one of the upper yoke holes 138 and one of the lower yoke holes 140. As best seen in FIG. 19, the yoke openings 142 preferably have a smaller diameter than the upper and lower yoke holes 138 and 140, thereby enabling exposure of a portion of the corresponding end faces 106 and 108, in addition to the portion of the interior of the core 28 defining the corresponding yoke opening 142.

The yoke openings 142 preferably extend at least substantially axially, with the upper and lower yoke holes 138 and 140 being axially and arcuately aligned with the yoke openings 142.

The tooth portions 122 and the yoke portion 120 are preferably integrally formed with each other, as will be discussed in greater detail below. More particularly, the tooth portions 122 and the yoke portion 120 are preferably integrally overmolded over the core 28.

Figure 6:
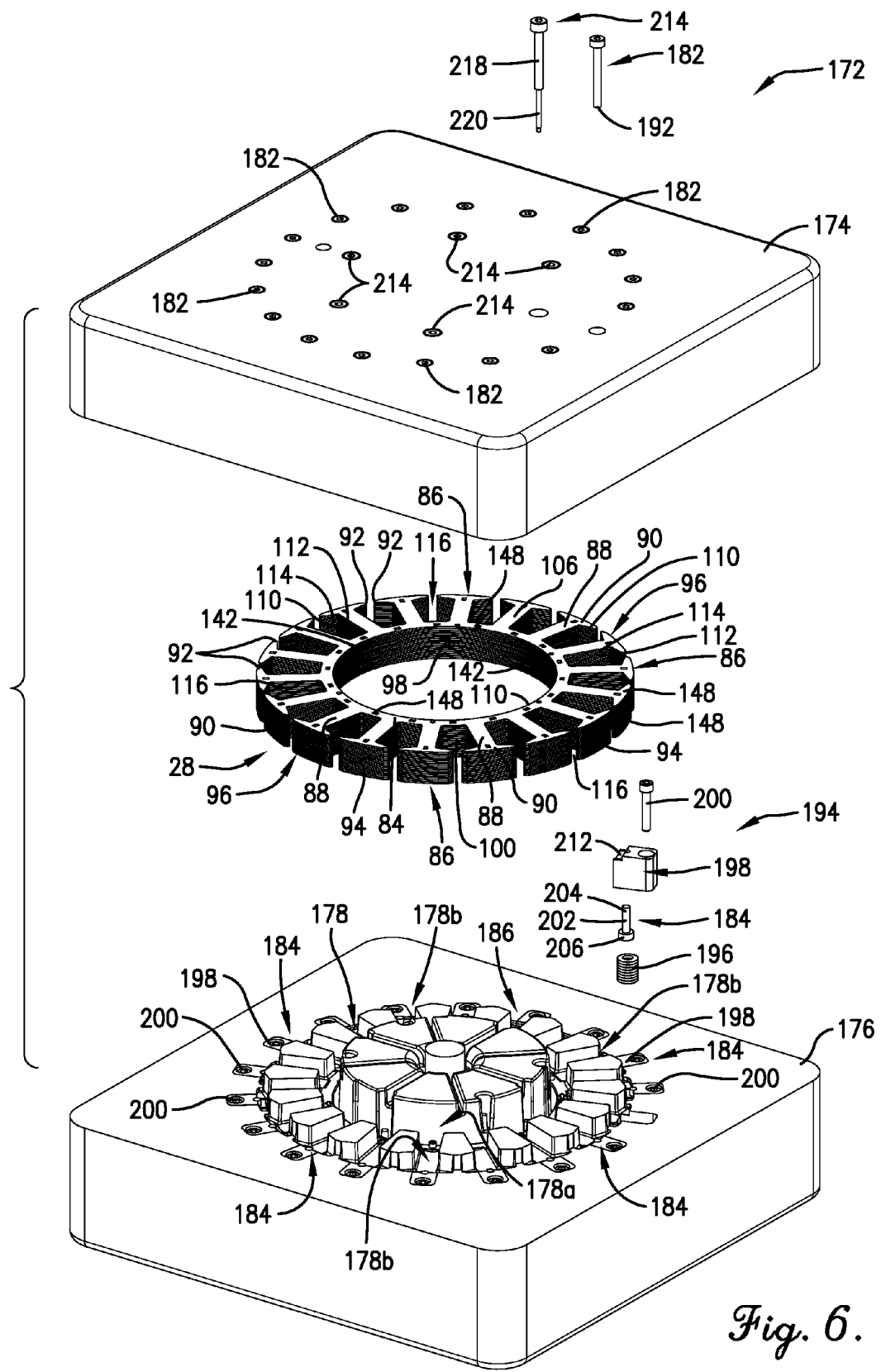
FIG. 6 is an exploded top perspective view of the mold of FIG. 5 and the stator core of the motor of FIGS. 1-4.
Figure 7:
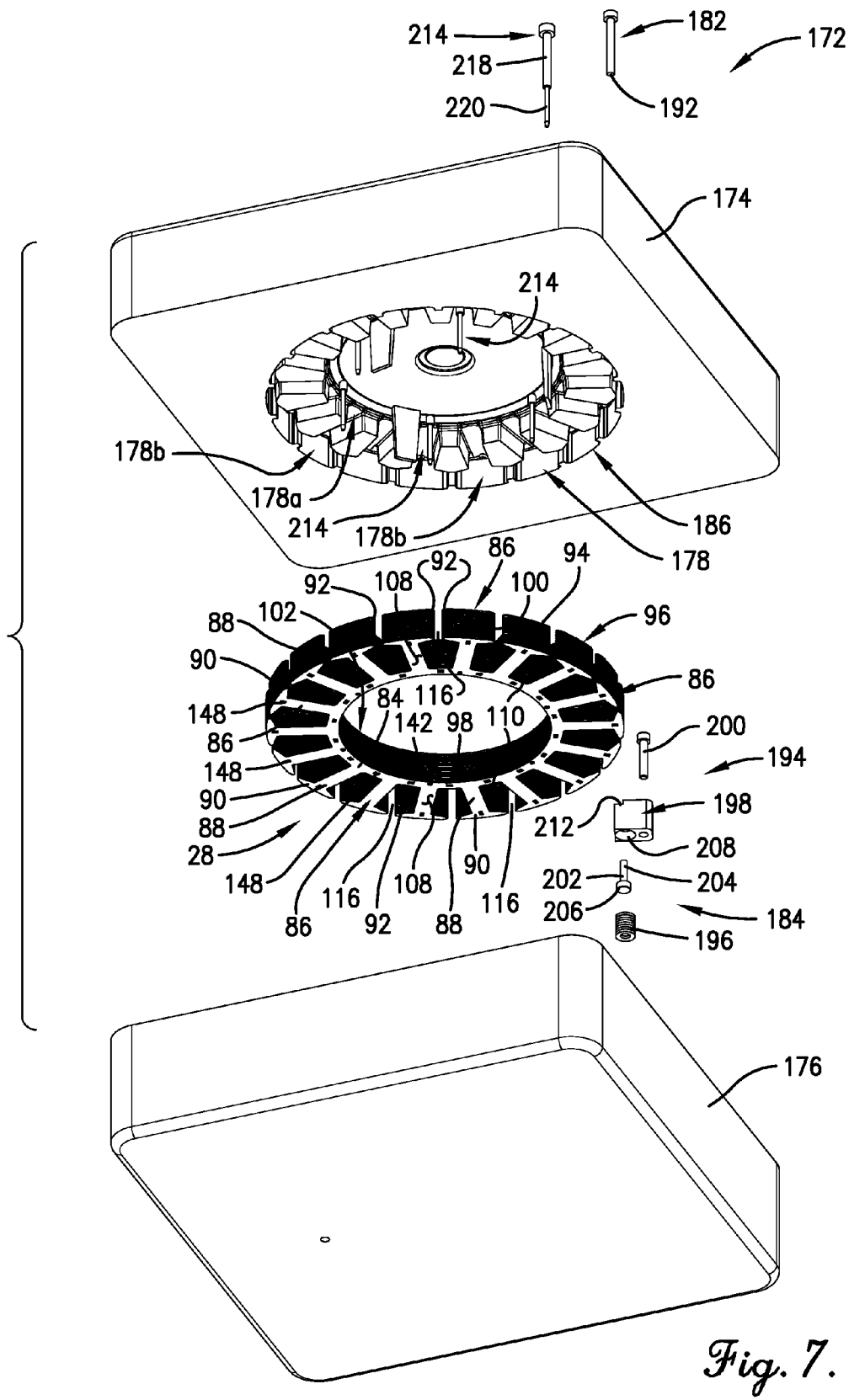
FIG. 7 is an exploded bottom perspective view of the mold and stator core of FIG. 6.

In a preferred embodiment, as best shown in FIGS. 6 and 7, each of the teeth 86 further includes an axially extending tooth slit 144 extending therethrough. Preferably, each tooth slit 144 is positioned adjacent the interface between the arm 88 and the crown 90 of the respective tooth 86.

The covering 30 preferably includes a plurality of tooth pillars 146 corresponding to and extending through the tooth slits 144.

In a preferred embodiment, as best shown in FIGS. 6 and 7, the yoke 84 further includes a plurality of axially extending yoke slits 148 extending therethrough. Preferably, the yoke slits 148 are evenly arcuately arranged. More particularly, each yoke slit 148 is preferably positioned in radial alignment with a corresponding one of the slots 116 defined by the teeth 86.

The covering 30 preferably includes a plurality of yoke pillars 150 corresponding to and extending through the yoke slits 148.

As best shown in FIGS. 2 and 4, the covering 30 also preferably defines an electronics compartment 152 that receives motor electronics 154 therein. More particularly, the covering 30 preferably includes a central body portion 155 including a generally circumferential wall 155a and a generally radially extending base 155b from which the wall 155a extends. The wall 155a and the base 155b cooperatively at least in part define the electronics compartment 152.

In a preferred embodiment, as illustrated, the motor electronics 154 include a motor control including a printed circuit board 154a and various electronic components 154b mounted to the board 154a. More particularly, the covering 30 presents a plurality of arcuately spaced apart electronics bosses 156, each of which defines an electronics fastener-receiving opening 158 that receives an electronics fastener 160 that secures the board 154a to the stator 18. In a preferred embodiment, four (4) electronics bosses 156 are provided, although more or fewer are permissible without departing from the scope of the present invention.

The covering 30 also preferably defines a mounting flange 162 connectable to a structure such that the covering 30 is operable to support the core 28 on the structure or, alternatively, to support the structure on the core. For instance, an electronics compartment cover (not shown but preferably provided) might be mounted on the mounting flange 162.

The mounting flange 162 preferably presents a plurality of mounting bosses 164, each of which defines a mounting fastener-receiving opening 166 configured to receive a mounting fastener (not shown).

Furthermore, in a preferred embodiment and as best shown in FIGS. 2, 4, 9, and 12, the mounting flange 162 in part defines the electronics compartment 152 (in cooperation with the central body portion 155) and defines a plurality of wire routing slots 168 providing access to the electronics compartment 152.

Figure 3:
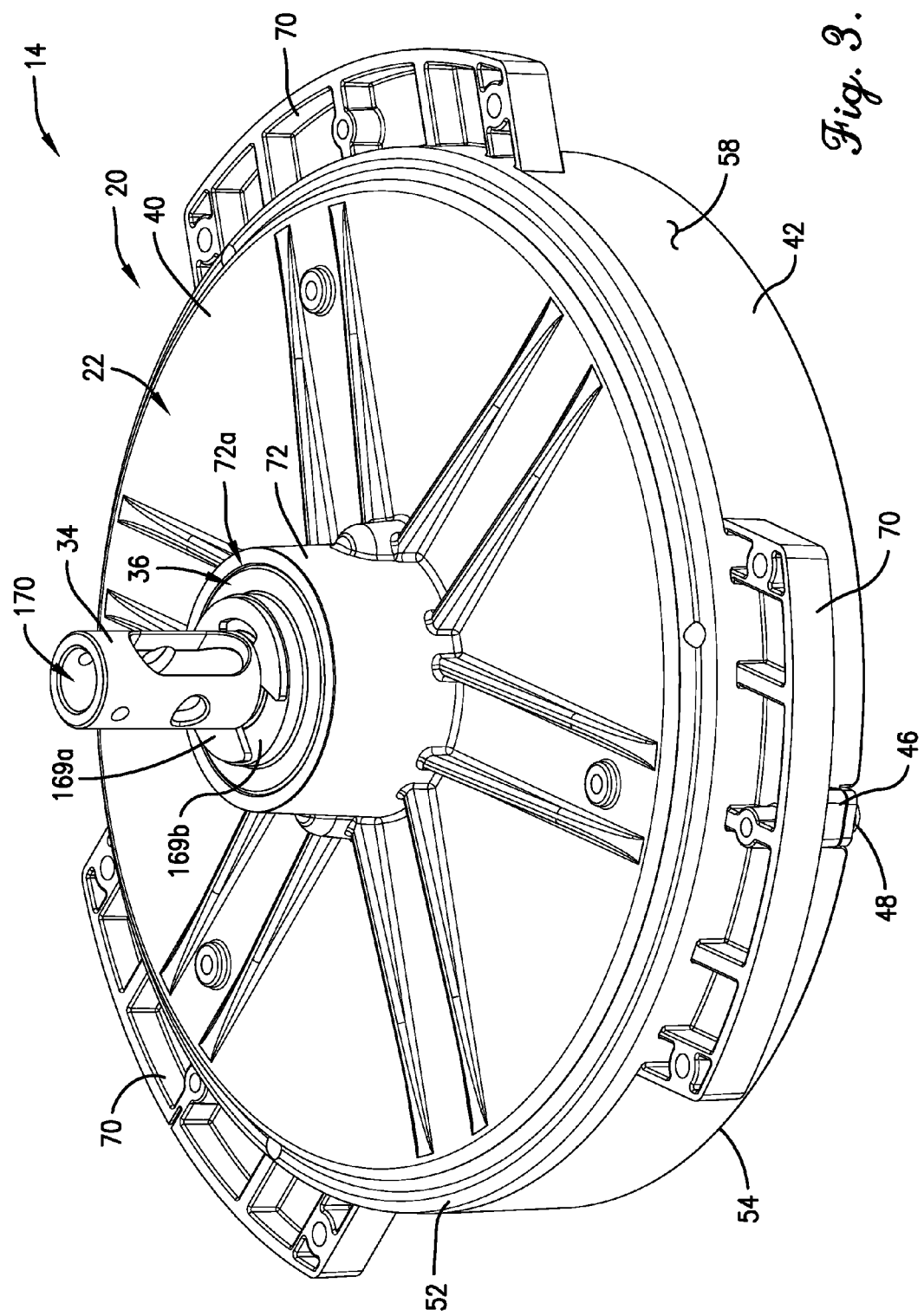
FIG. 3 is a top perspective view of the motor of FIG. 2.

A shaft opening 170 (see FIGS. 3 and 19) enables the routing of a harness or other electrical connectors (not shown) to the motor electronics 154 through the shaft 34.

The covering 30 is preferably at least substantially rigid. More specifically, the covering is preferably formed of plastic or another suitable synthetic resin material that fixedly supports the core 28, the coils 32, and the electronics 154 on the shaft 34. More particularly, the base 155b of the central body portion 155 preferably defines a shaft-receiving opening 155c. The shaft 34 is received in the opening.

Various means of shaft interconnection are permissible within the ambit of the present invention. The shaft might be press-fit or molded into the opening for instance, or a separate coupling element might be provided.

Preferably, a plurality of clip rings 169a and at least one washer 169b are provided on the shaft 34 to restrict axial shifting of the stator 18 and the rotor 20 relative to the shaft 34. More particularly, clip rings 169a are preferably provided immediately above and below the base 155b of the body portion 155 of the covering 30 and above the bearing assembly 136. A washer 169b is preferably provided above the bearing assembly 136, between the bearing assembly 136 and the corresponding one of the clip rings 169a.

Overmolding of Stator Core

Figure 5:
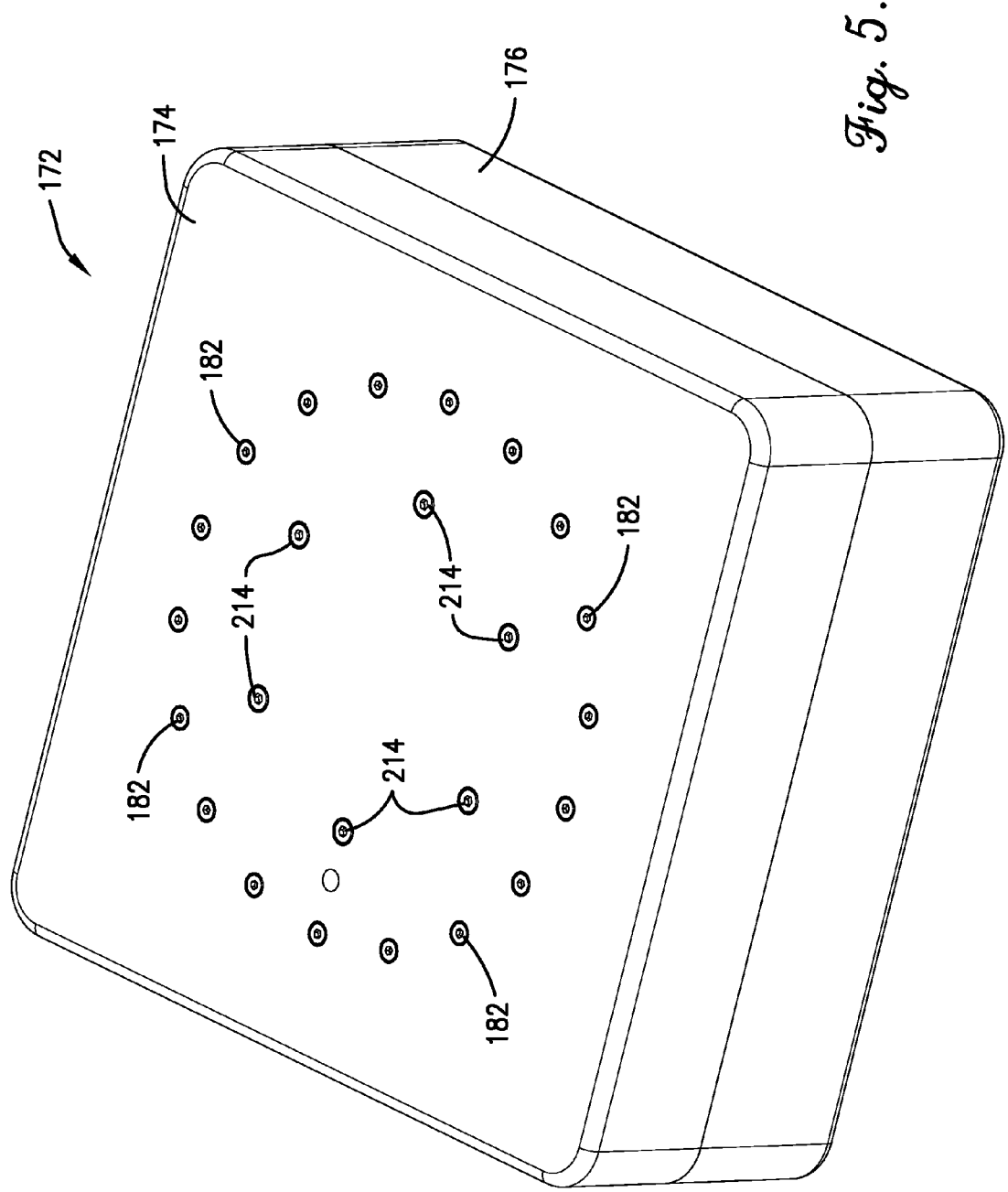
FIG. 5 is a top perspective view of a mold for overmolding the core of the stator of the motor of FIGS. 1-4, particularly illustrating the mold in a closed position.
Figure 8:
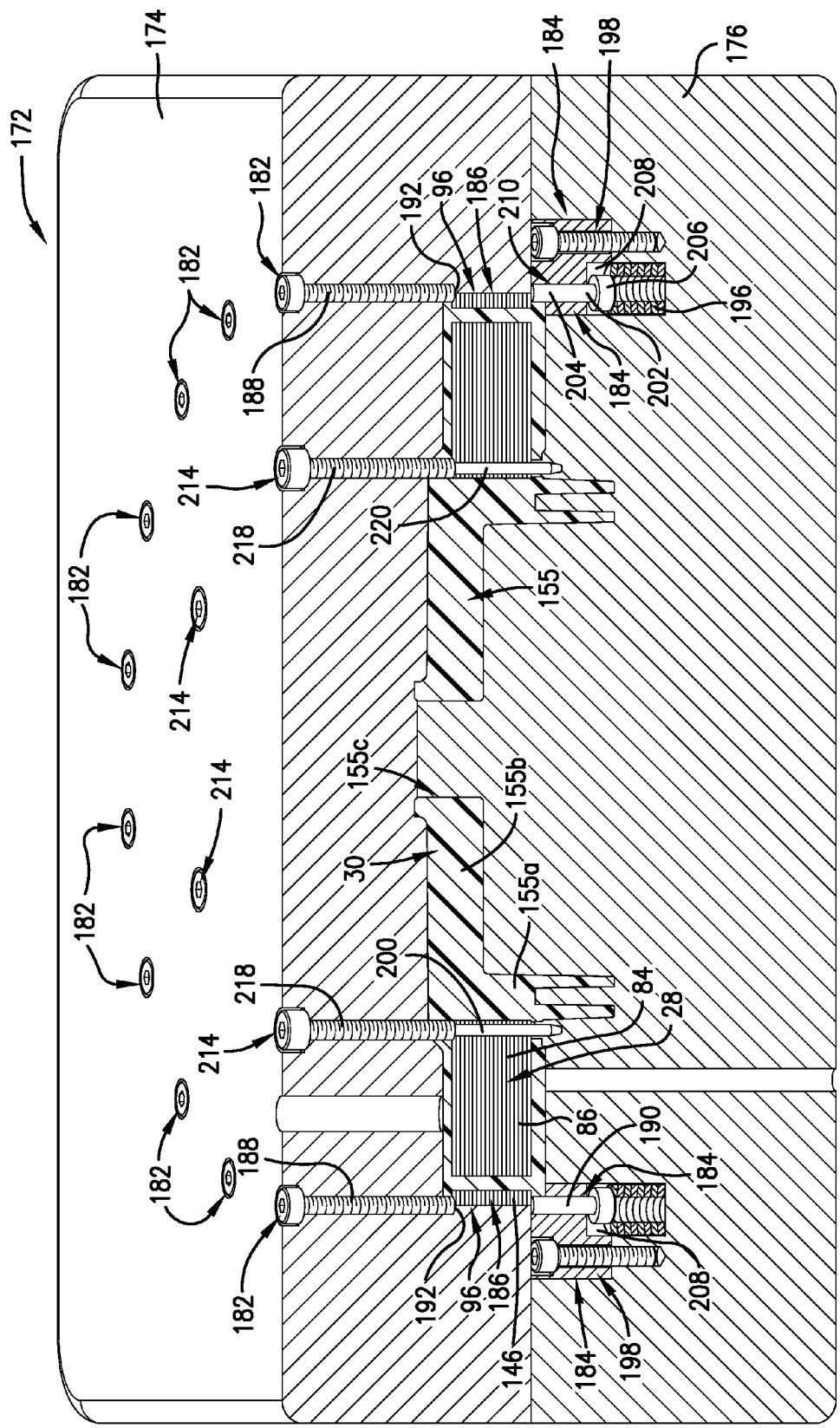
FIG. 8 is a cross-sectional perspective view of the mold and stator core of FIGS. 5-7, in addition to the covering applied to the core during the overmolding process.
Figure 9:
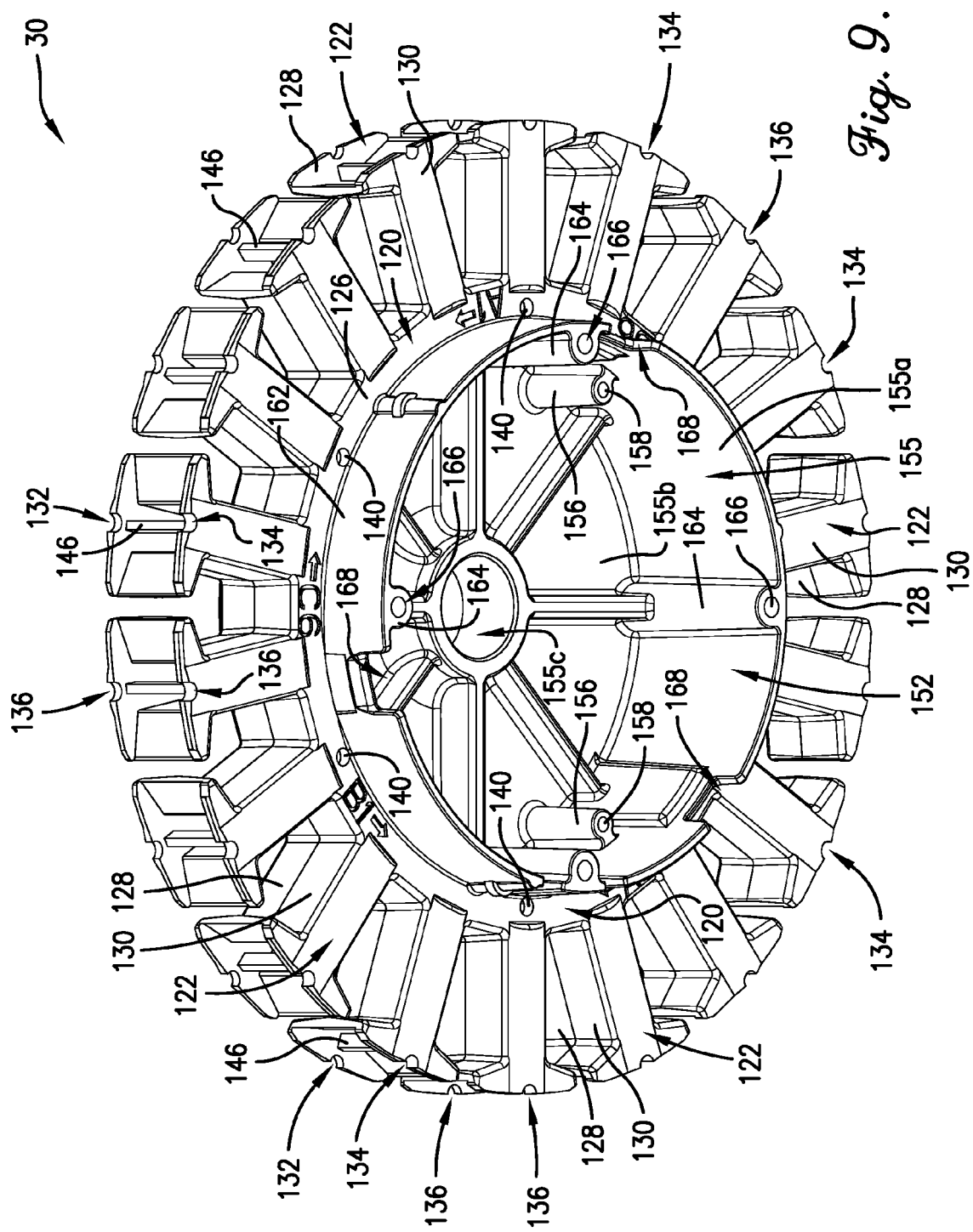
FIG. 9 is a bottom perspective view of the covering of FIG. 8.
Figure 10:
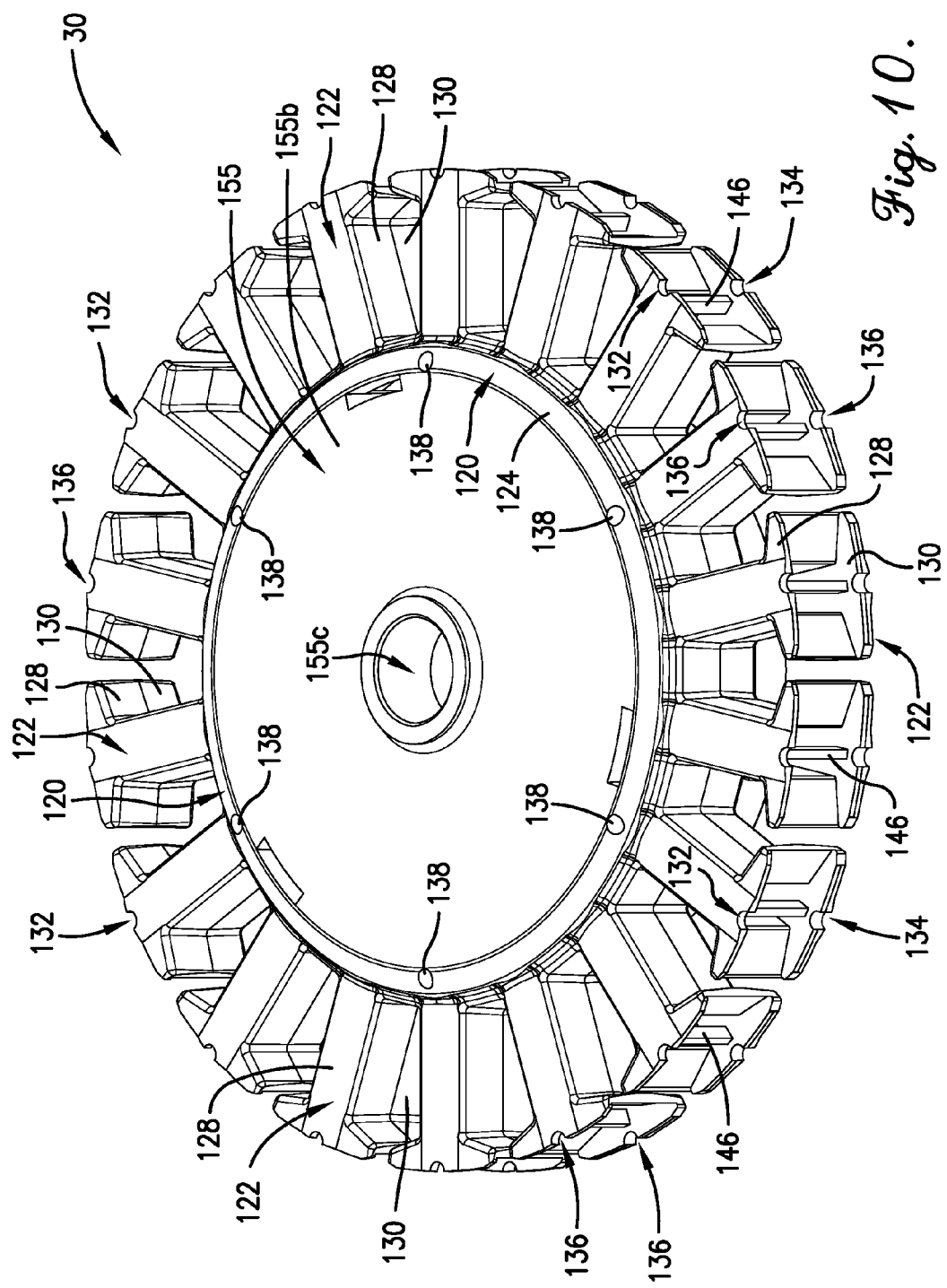
FIG. 10 is a top perspective view of the covering of FIGS. 8 and 9.
Figure 11:
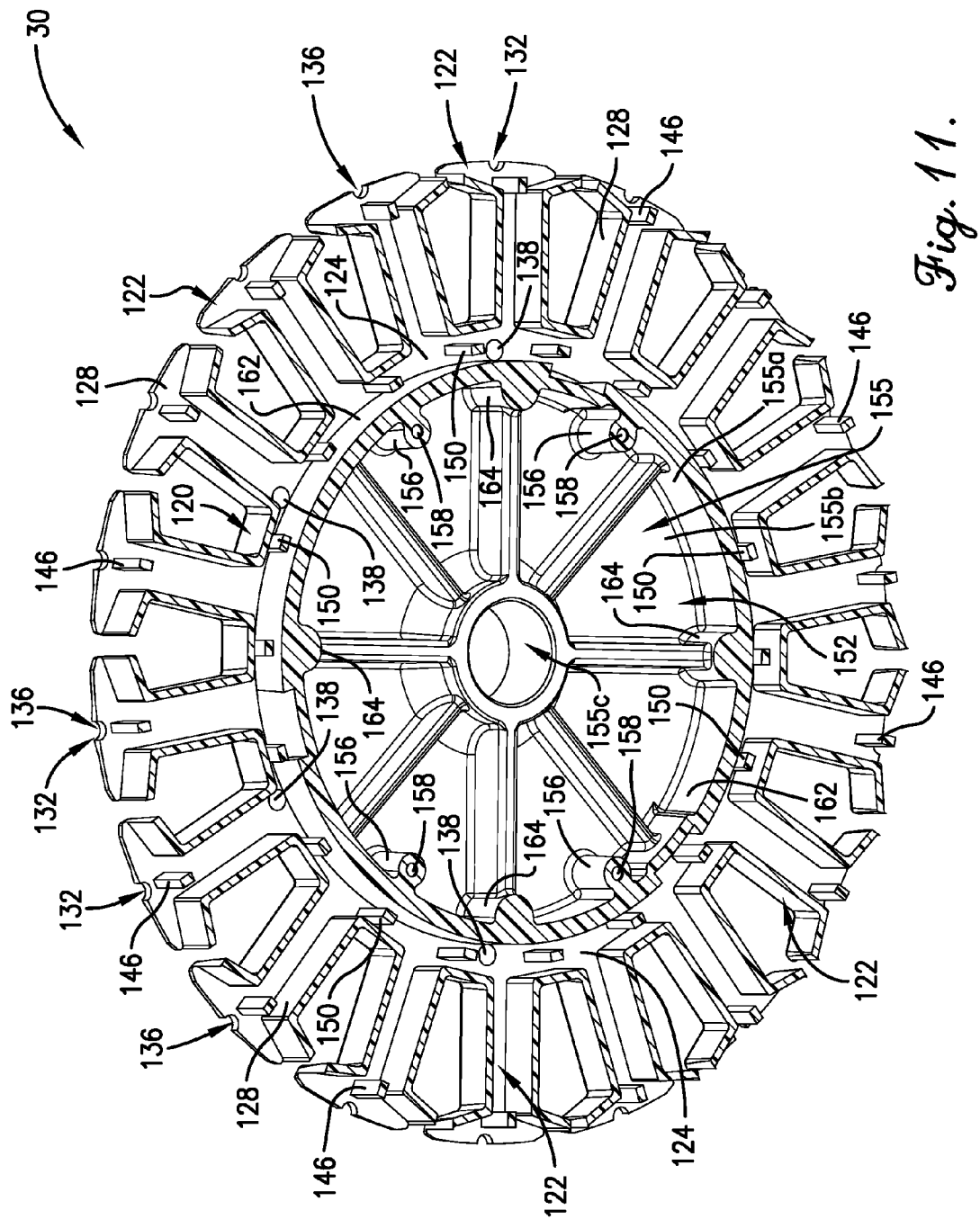
FIG. 11 is a cross-sectional bottom perspective view of the covering of FIGS. 8-10.
Figure 13:
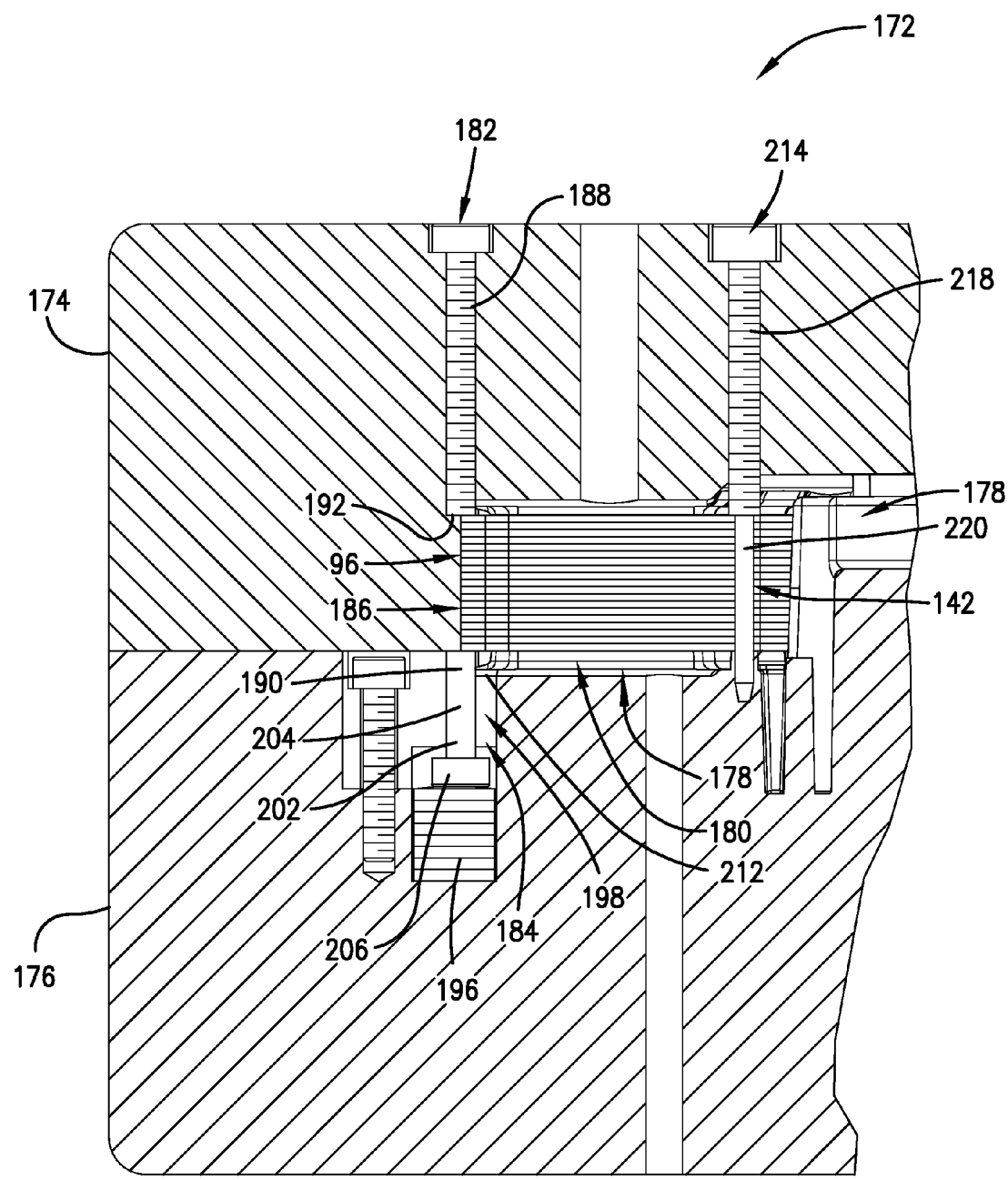
FIG. 13 is an enlarged, partially fragmented cross-sectional side view of the mold and stator core, as depicted in FIGS. 5-8 and with various parts of the mold being fragmented and/or cross-sectioned, particularly illustrating the positioning of the pins relative to the stator core.

As shown in FIGS. 5-8 and 13, in a preferred embodiment, the electrically insulative covering 30 is overmolded onto the core 28 using a mold 172. It is noted that, for the sake of clarity, the mold 172 is shown only schematically. That is, as will be readily understood by one of ordinary skill in the art, components non-essential to the disclosure the invention (e.g., hoppers, heaters, nozzles, etc.) are omitted; and those components that are essential to disclosure of the invention may be illustrated in a simplified form The mold 172 preferably includes an upper cavity-defining portion 174 and a lower cavity-defining portion 176. At least one of the upper cavity-defining portion 174 and the lower cavity-defining portion 176 is preferably moveable, such that the mold 172 is configurable between an open position as shown in FIGS. 6 and 7, and a closed position, as shown in FIGS. 5, 8, and 13.

The upper and lower cavity-defining portions 174 and 176 generally define a cavity 178 therebetween when the mold 172 is in the closed position. Preferably, the cavity 178 corresponds to the core 28 of the stator 18 and, as shown in FIG. 8, receives the core 28 therein during the overmolding process.

More particularly, the cavity 178 preferably defines an axis corresponding to an axis of the core 28. Furthermore, the cavity 178 preferably includes a generally arcuate yoke region 178a and a plurality of arcuately spaced apart tooth regions 178b extending generally radially from the yoke region 178a. The yoke region 178a preferably corresponds to the yoke 84 of the core 28, while the tooth regions 178b preferably correspond to the teeth 86 of the core 28. During the overmolding process, the yoke 84 is received in the yoke region 178a, and the teeth 86 are received in corresponding ones of the tooth regions 178b.

The cavity 178 further preferably includes an accommodation region 180, best shown in FIG. 13, configured to accommodate variations in the axial height of the core 28. For instance, the accommodation region 180 is configured to accommodate variations in stack height (i.e., axial height) of the core 28 that can occur due to the accumulation of small deviations from the ideal thickness of the laminations of the core 28.

The axial covering thickness in the accommodation region 180 is preferably less than about five (5) mm, although the actual thickness will depend on the core stack height (i.e., the axial height of the core 28). In the most preferred embodiment, the stack height of the core 28 is such that the covering has a thickness of about one (1) mm along the end faces 106 and 108 adjacent the teeth 86. Therefore, with the preferred core height of about fifteen (15) mm, the preferred wiring thickness of about two (2) mm, and the preferred covering thickness of about one (1) mm, the stator 18 preferably presents a maximum height of approximately twenty-one (21) mm, as defined along the teeth 86 of the core 28.

In a preferred embodiment, each of a plurality of arcuately spaced apart upper pins 182 extends generally axially toward the lower cavity-defining portion 176, while each of a corresponding plurality of arcuately spaced apart lower pins 184 extends generally axially toward the upper cavity-defining portion 176. The upper and lower pins 182 and 184 extend in part into the cavity 178 when the mold 172 is in the closed position to cooperatively at least in part secure the core 28 in the cavity.

More particularly, as best shown in FIGS. 8 and 13, the upper and lower pins 182 and 184 each preferably engage respective ones of the upper and lower faces 106 and 108 of the core 28. Corresponding pairs of the upper and lower pins 182 and 184 are preferably at least substantially axially aligned and, upon engagement of the core 28, cooperatively apply an axially compressive load thereto. Axial movement of the core 28 is thereby at least substantially restricted.

Engagement of the upper and lower pins 182 and 184 with the core 28 causes the formation of the previously described upper and lower tooth openings 132 and 134, respectively, in the covering 30.

The upper and lower cavity-defining portions 174 and 176 preferably define a radially outermost cavity margin 186 corresponding to the first radial margin 96 of the core 28. Each of the upper and lower pins 182 and 184 includes a respective radially innermost portion 188 or 190 that is at least in part positioned radially inside the radially outermost cavity margin 186.

The positioning of the radially innermost portions 188 and 190 radially inside the radially outermost cavity margin 186 causes the formation of the previously described notches 136 in the covering 30. Preferably the pins 182 and 184 are circular in cross-section, such that, as described above, the notches 136 have a semi-circular shape.

Although the axial alignment of the upper and lower pins 182 and 184, their correspondence with each tooth 86, and the other configuration details described above are preferred, alternative arrangements of the upper and lower pins are permissible according to some aspects of the present invention. Such alternative arrangements correspond to those discussed in greater detail above with respect to the upper and lower tooth openings 132 and 134.

In a preferred embodiment, the upper pins 182 are axially fixed when the mold 172 is in the closed position. More particularly, each of the upper pins 182 presents an endmost margin 192. The endmost margins 192 cooperatively define a fixed, generally radially extending plane.

In contrast, the lower pins 184 are preferably axially moveable when the mold 172 is in the closed position. More particularly, the lower pins 184 are preferably biased toward the upper cavity-defining portion 174 when the mold 172 is in the closed position. Such biasing enhances the ability of the pins 182 and 184 to cooperatively axially compress and secure the core 28 while accommodating minor variations in its axial height due, for instance, to stacked tolerances associated with the laminations of the core. (It is noted that the principles of the inventive mold are not limited to use solely with laminated cores.)

It is also permissible according to some aspects of the present invention for the upper pins to be biased in addition to or instead of the lower pins or for neither set of pins to be biased.

In a preferred embodiment, the mold 172 includes a plurality of spring assemblies 194 each corresponding to one of the lower pins 184. As best shown in FIGS. 6, 7, 8, and 13, each spring assembly 194 includes a spring 196, a spring block 198, and a block fastener 200 removably securing the block 198 to the lower cavity-defining portion 176 of the mold 172. As will be described in greater detail below, each spring 196 is preferably positioned below a corresponding lower pin 184 to bias the lower pin 184 toward the upper cavity-defining portion 174. Alternative biasing means are permissible without departing from the scope of some aspects of the present invention, however.

As described in more detail below, the spring block 198 generally serves to guide, support, and secure the corresponding lower pin 184 as it shifts under the influence of the corresponding spring 196.

More particularly, each lower pin 184 preferably includes a distal end 202 spaced away from the core 28 and a proximal end 204 adjacent the core 28. The distal end 202 preferably includes an enlarged head 206 of the lower pin 184.

Furthermore, the spring block 198 preferably includes a distal recess 208 for receiving the corresponding spring 196, the head 206, and a least a portion of the distal end 202 of the corresponding lower pin 184. (The degree to which the distal end 202 is received in the distal recess 208 will vary according to the degree of extension of the spring 196.) The spring block 198 further preferably includes a proximal recess 210 for receiving the proximal end 204 and potentially a portion of the distal end 202 of the lower pin 184. (The degree to which the distal end 202 is received in the proximal recess 208 will vary according to the degree of extension of the spring 196.)

A spring block shoulder 212 is defined between the distal and proximal recesses 208 and 210, respectively. The spring block shoulder 212 preferably restricts the axially upward shifting of the corresponding lower pin 184 by engaging the head 206 of the corresponding lower pin 184.

In a preferred embodiment, the mold 172 further comprises a plurality of inner pins 214 extending at least in part through the core 28 to at least substantially restrict radial shifting of the core 28. Most preferably, the inner pins 214 extend at least substantially axially through the entirety of the core 28.

Preferably, each of the inner pins 214 corresponds to the yoke 84 of the core 28 and the yoke portion 120 of the covering 30. More particularly, when the mold 172 is in the closed position, the inner pins 214 extend through the previously described yoke openings 142. The presence of the inner pins 214 in such a position results in the formation of the aforementioned upper and lower yoke holes 138 and 140.

Preferably, each of the inner pins 214 presents a generally radially extending shoulder 216 defined between an wide region 218 and a narrow region 220 of the corresponding inner pin 214. As best shown in FIG. 13, the narrow region 220 of each inner pin 214 preferably extends into the corresponding one of the yoke openings 142, while the shoulder 216 engages the core 28 and restricts axial movement of the respective inner pin 214 relative to the core 28. The region in which the shoulder 216 engages the core remains uncovered by the covering 30, as noted above.

The wide region 218 of each inner pin 214 is preferably threaded through the upper cavity-defining portion 174.

Although the above-described configuration is preferred, it is within the scope of some aspects of the present invention, however, for the inner pins to be alternatively configured. Among other things, for instance, the inner pins might have constant cross-sections, be devoid of threading, and/or be inserted through the lower cavity-defining portion.

High Efficiency Power Supply Design

Figure 20:
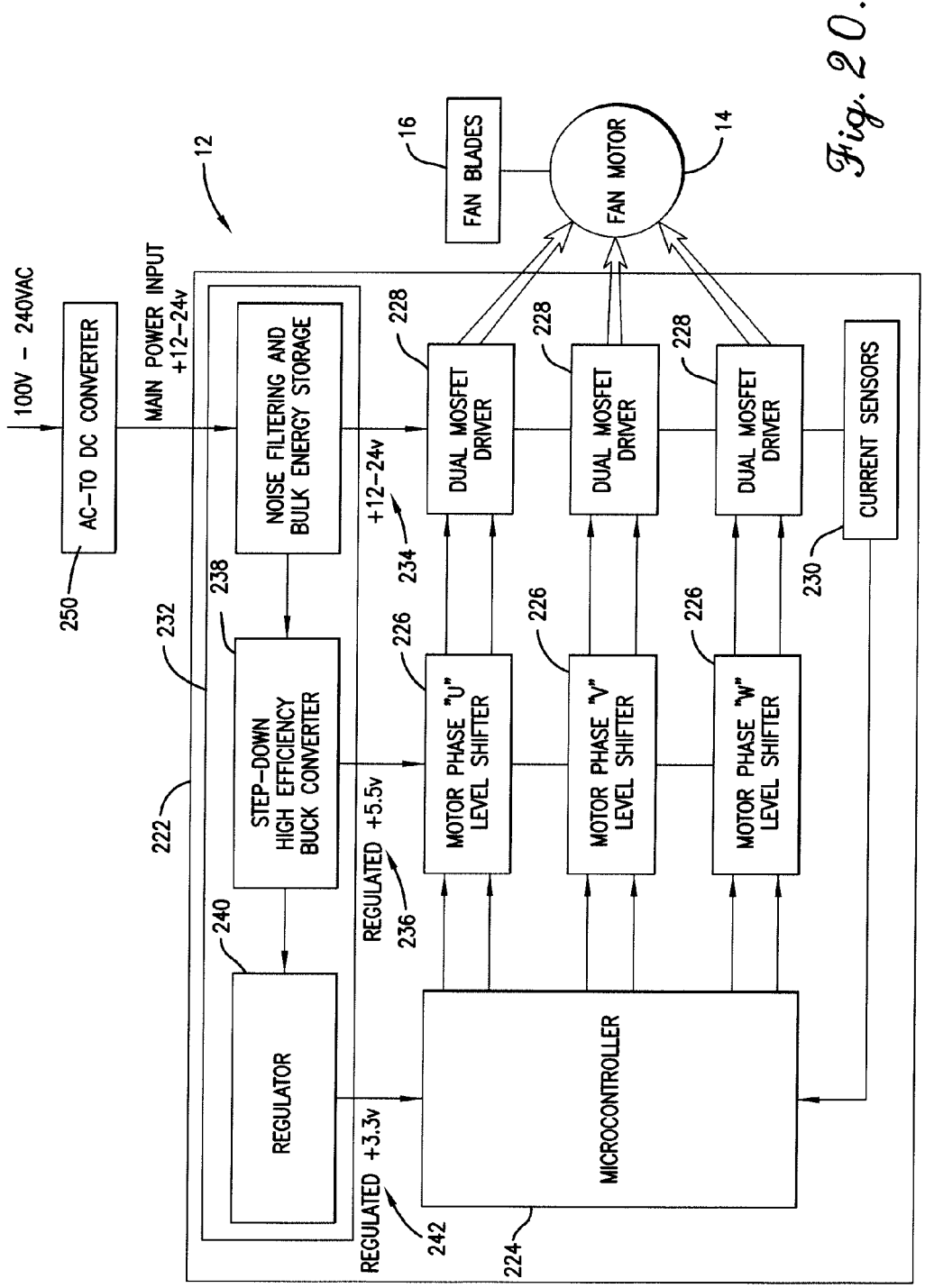
FIG. 20 is a schematic view of the motor of FIGS. 2-4.
Figure 21:
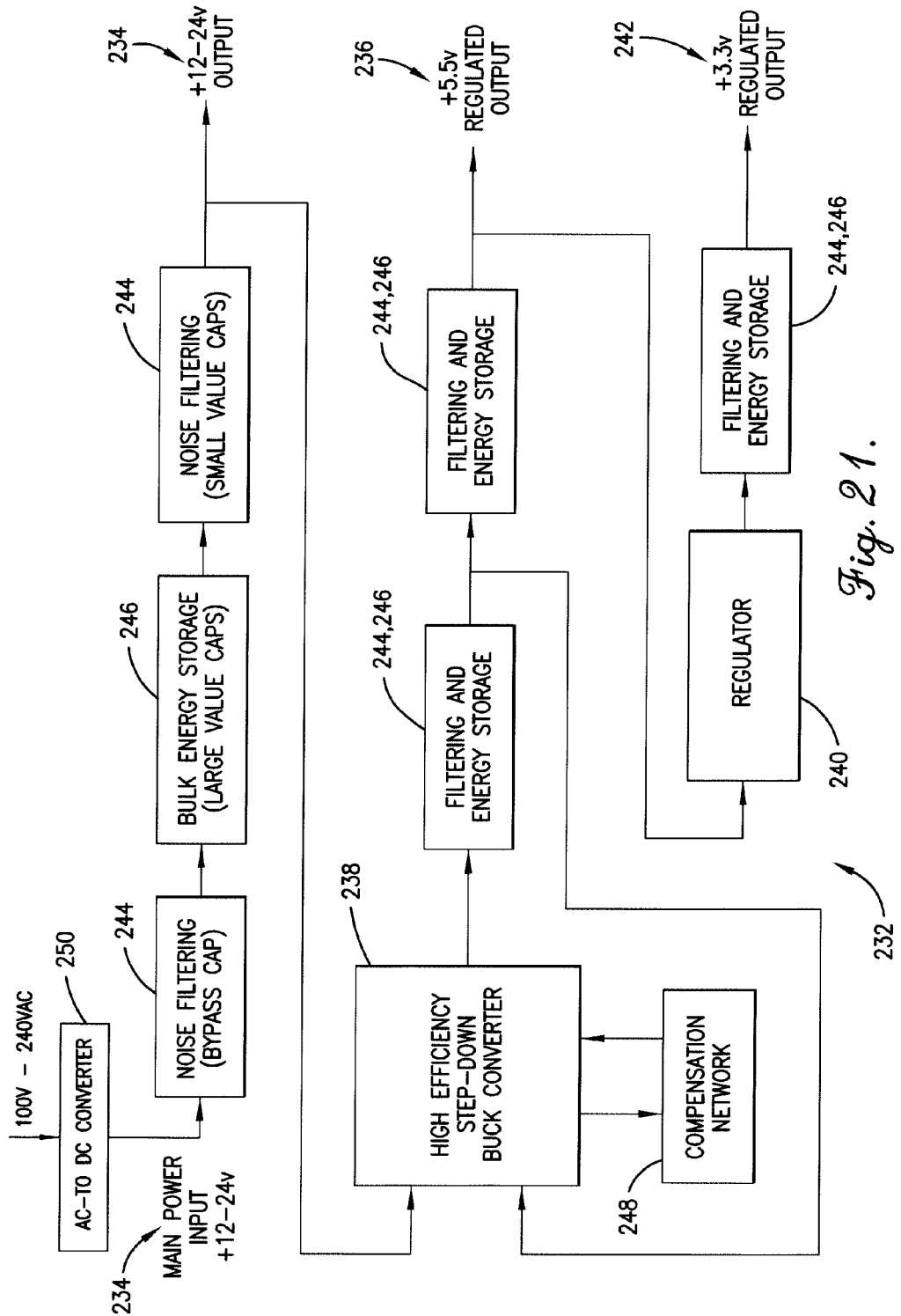
FIG. 21 is a schematic view of the high-efficiency power supply of FIG. 20.
Figure 22:
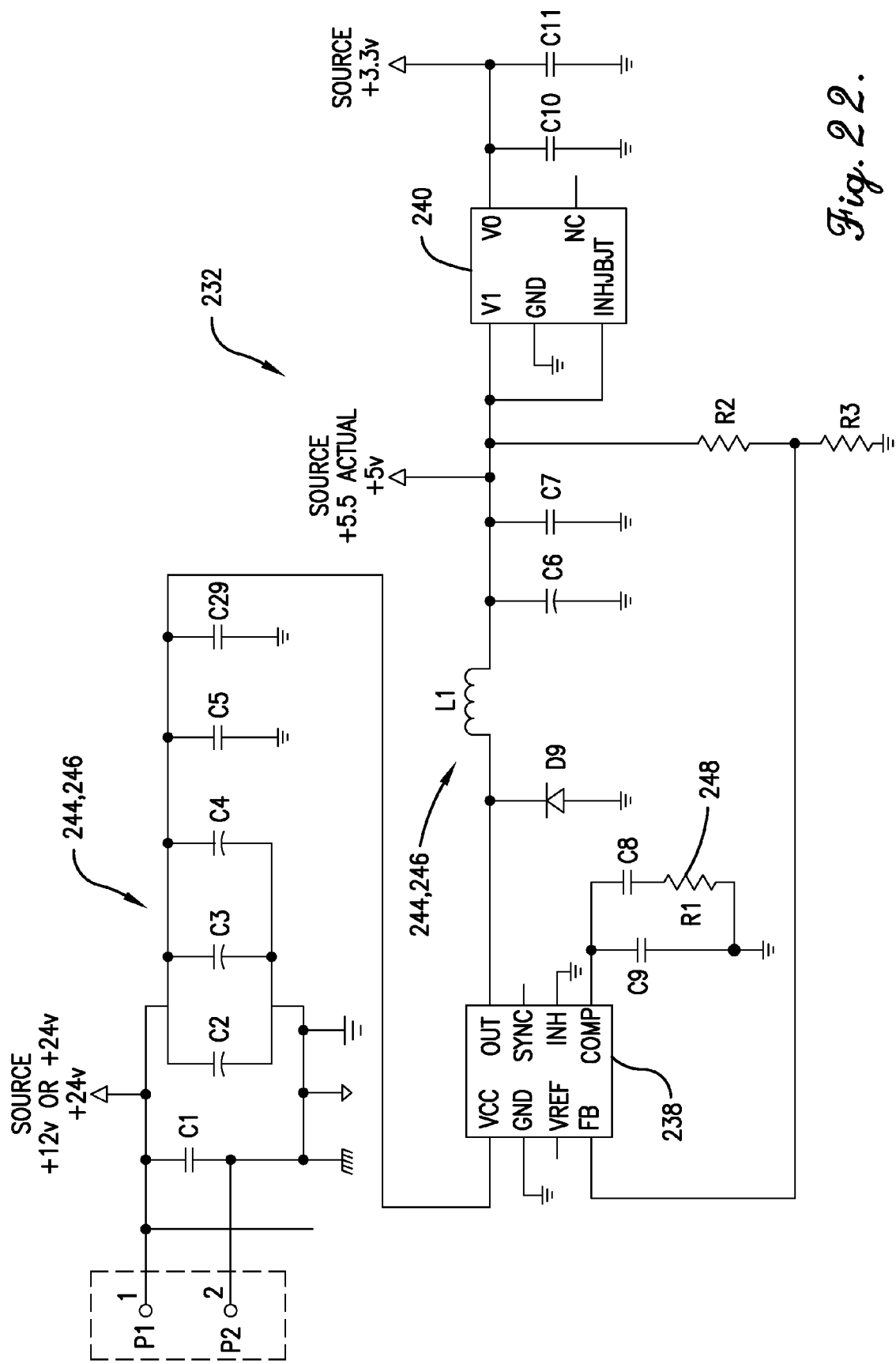
FIG. 22 is a circuitry schematic view of the high-efficiency power supply of FIGS. 20 and 21.

As noted previously, the fan 12 of the present invention preferably includes a highly efficient power supply. More particularly, as illustrated in FIGS. 20-22, the fan 12 preferably includes a motor control 222 (part of the previously described motor electronics 154) for controlling the motor 14.

The motor 14 may be, for example, a three-phase motor such as a three-phase wye-connected brushless DC permanent magnet motor. However, other motors may be used with the motor control described herein without departing from the scope of the invention.

The motor control 222 may comprise a controller 224, level shifters 226, drivers 228, sensors 230, and a high-efficiency power supply 232. The controller 224 may be a microcontroller, microprocessor, or the like configured to send and receive control signals for controlling operational characteristics of the motor 14. In some embodiments of the invention, the controller 224 may be configured to operate at lower voltages than the motor 14. For example, the controller 224 may be operated at three and three tenths (3.3) volts (V) while the drivers 228 and/or the motor 14 may be driven at twelve (12) to twenty-four (24) V. The controller 224 may comprise a programming port (not shown) for initially receiving computer-readable instructions and/or software updates, and may also comprise a user interface port (not shown) for receiving commands from a user, such as by way of a customer option board, switches, dials, buttons, or any other user interfaces known in the art.

The level shifters 226 may include three motor phase level shifters electrically coupled between the controller 224 and the drivers 228 of the motor control 222, creating an interface between the low voltage domain of the controller 224 and the higher voltage domain of the drivers 228. The level shifters 226 may also be configured to operate at lower voltages than the motor 14. For example, the level shifters 226 may be operated at five and five-tenths (5.5) V while the drivers 228 and/or the motor 14 may be driven at twelve (12) to twenty-four (24) V. In some embodiments of the invention, the level shifters 226 may comprise a motor phase "U" level shifter, a motor phase "V" level shifter and a motor phase "W" level shifter, as illustrated in FIG. 21.

The drivers 228 may be electrically coupled between the level shifters 226 and the motor 14. Specifically, there may be three drivers 228 electrically coupled to provide three phase voltage to the motor 14. In some embodiments of the invention, the drivers 228 are dual MOSFET drivers. However, other drivers known in the art may be used without departing from the scope of the invention.

The sensors 230 may comprise current sensors electrically coupled between the drivers 228 and the controller 224 and may be configured to provide feedback to the controller 224.

This sensed current may be used by the controller 224 to sense any errors or overload situations and to take corrective or protective action accordingly.

The high efficiency power supply 232 described herein may be configured to increase fan efficiency at all rated speeds. Specifically, the high efficiency power supply 232 is configured to decrease input power from a higher voltage to a lower voltage. The higher voltage may still be used to drive the motor 14 and/or drivers 228 thereof, as illustrated in FIG. 20, but other components of the motor control 222, such as the level shifters 226 and various other switching components, may be operated by the lower voltage, thus keeping switching losses lower than traditional motor power supplies.

The high efficiency power supply 232 may be any power supply configured to drop a first input voltage 234, received from an external power source, to a second lower voltage 236. For example, as illustrated in FIGS. 20-22, the high efficiency power supply may comprise a step-down buck converter 238 and a regulator 240, which may be a low drop-out voltage regulator. Additionally or alternatively, the buck converter 238 or voltage regulator 240 may be replaced with a switching regulator or a step-down very low drop out linear regulator without departing from the scope of the invention. The step-down buck converter 238 may output the second lower voltage 236 for driving the level shifters 226, while the low drop-out voltage regulator 240 may output a third lowest voltage 242 for driving the controller 224, as illustrated in FIG. 20. The third lowest voltage 242 may be less than the second lower voltage 236. However, in some embodiments of the invention, the controller 224 may be driven by the second lower voltage 236 output by the step-down buck converter 238, and the low drop-out voltage regulator 240 may be omitted without departing from the scope of the invention.

The external power source may be accessed via an electrical outlet or any other input power connections known in the art. For instance, the external power source may include or couple to the aforementioned converter (250) that converts 100-240 VAC to 12-24 VDC. Thus, in a preferred embodiment, the first input voltage 234 may be, for example, twelve (12) V or twenty-four (24) V, and the second lower voltage 236 may be in the range of five (5) V to six (6) V. However, any first input voltage 234 may be reduced to any second lower voltage 236 depending on the configuration of the high efficiency power supply 232. For example, the second lower voltage 236 could be in the range of four (4) V to nine (9) V. A lower limit to the second lower voltage 236 may be determined based on the minimum switching voltage required by switching components or the level shifters 226 of the motor control 222. The third lowest voltage 242 may be, for example, in the range of three (3) V to four (4) V. However, the third lowest voltage 242 may be set to any voltage sufficient to drive the controller 224 without departing from the scope of the invention.

In some embodiments of the invention, as illustrated in FIG. 21, the high efficiency power supply 232 may further comprise noise filtering circuitry 244, bulk energy storage circuitry 246, other various filtering and energy storage circuitry, and/or a compensation network 248. The noise filtering and bulk energy storage circuitry 244 and 246, respectively, as illustrated in FIGS. 21-22, may comprise various capacitors arranged in parallel with each other and/or any other configurations known in the art. Notice that filtering and energy storage may occur before and after the buck converter 238 and voltage regulator 240, as illustrated in FIGS. 21-22. In one embodiment of the invention, as illustrated in FIG. 22, the noise filtering and bulk energy storage circuitry 244 and 246 may include a plurality of capacitors C1-C11 and C29, resistors R1-R3, an inductor L1, a diode D9, and various input terminals P1 and P2.

Motor Performance

The fan 12 is preferably configured to achieve low-speed efficiencies of at least about fifty percent (50%) and high-speed efficiencies of at least about seventy percent (70%). For instance, FIG. 23 presents test data associated with a motor suitable for use in the preferred fan embodiment of the present invention. The data is provided for speeds ranging from seventy (70) to two hundred one (201) revolutions per minute (rpm), which correspond to torques from one tenth (0.100) to one (1.000) Newton-meter (N-m) and power usages from one and forty-three hundredths (1.43) to twenty-nine and fifty-six hundredths (29.56) Watts (W). Efficiencies corresponding to these parameters range from fifty-one and three tenths percent (51.3%) to seventy-one and two tenths percent (71.2%).

CONCLUSION

Although the above description presents features of preferred embodiments of the present invention, other preferred embodiments may also be created in keeping with the principles of the invention. Furthermore, these other preferred embodiments may in some instances be realized through a combination of features compatible for use together despite having been presented independently in the above description.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention set forth in the following claims.

What is claimed is:

1. A fan comprising:
   at least one fan blade;
   a fan motor configured to rotate the fan blade;
   a motor control comprising a microcontroller, level shifters electrically coupled to the microcontroller, and drivers electrically coupled to the level shifters and configured to drive the fan motor; and
   a power supply comprising a step-down high efficiency buck converter and a step-down low drop-out linear voltage regulator,
   wherein the drivers are configured to receive a first input voltage for driving the fan motor, wherein the step-down high efficiency buck converter is configured to receive the first input voltage and to decrease the first input voltage to a second lower voltage, wherein the step-down high efficiency buck converter is configured to output the second lower voltage to the level shifters and to the step down low drop-out linear voltage regulator, wherein the step-down low drop-out linear voltage regulator is configured for receiving the second lower voltage from the step-down high efficiency buck converter and outputting a third lowest voltage which is lower than the second lower voltage, wherein the step down low drop-out linear voltage regulator is electrically coupled to the microcontroller and the third lowest voltage drives the microcontroller, wherein the first input voltage is in a range of 12V to 24V, wherein the second lower voltage is in a range of 4V to 7V, wherein the third lowest voltage is in a range of 3V to 4V.

2. The fan of claim 1, wherein the second lower voltage is equal to or greater than a minimum voltage required for switching the level shifters.

3. The fan of claim 1, wherein the second lower voltage is in a range of between 5V to 6V.

4. The fan of claim 1, further comprising an AC-to-DC converter configured to convert an input alternating current (AC) voltage in a range of 100V AC to 240V AC to an output direct current (DC) voltage in a range of 12V DC to 24V DC, wherein the first input voltage is the output DC voltage from the AC-to-DC converter.

5. The fan of claim 1, further comprising at least one of noise filtering circuitry, energy storage circuitry, and current sensors configured for providing feedback to the microcontroller.

6. A fan motor control configured for driving a three phase wye-connected brushless DC permanent magnet fan motor, the fan motor control comprising:
- a microcontroller configured for providing operational commands for the fan motor;
- three motor phase level shifters electrically coupled to the microcontroller;
- three MOSFET drivers electrically coupled to the level shifters and configured to drive the fan motor; and
- a power supply comprising a step-down high efficiency buck converter and a switching regulator,
- wherein the drivers are configured to receive a first input voltage for driving the fan motor, wherein the step-down high efficiency buck converter is configured to receive the first input voltage and to decrease the first input voltage to a second lower voltage, wherein the step-down high efficiency buck converter is configured to output the second lower voltage to the level shifters and the switching regulator, wherein the switching regulator is configured to output a third lowest voltage which is lower than the second lower voltage, wherein the switching regulator is configured to drive the microcontroller with the third lowest voltage, wherein the first input voltage is in a range of 12V to 24V, wherein the second lower voltage is in a range of 5V to 6V, wherein the third lowest voltage is in a range of 3V to 4V.

7. The fan motor control of claim 6, further comprising an AC-to-DC converter configured to convert an input alternating current (AC) voltage in a range of 100V AC to 240V AC to an output direct current (DC) voltage in a range of 12V DC to 24V DC, wherein the first input voltage is the output DC voltage from the AC-to-DC converter.

8. A fan comprising:
- at least one fan blade;
- a fan motor configured to rotate the fan blade;
- a motor control comprising a microcontroller, level shifters electrically coupled to the microcontroller, and drivers electrically coupled to the level shifters and configured to drive the fan motor;
- an AC-to-DC converter configured to convert an input alternating current (AC) voltage in a range of 100V AC to 240V AC to an output direct current (DC) voltage in a range of 12V DC to 24V DC; and
- a power supply comprising a step-down high efficiency buck converter and a step-down low drop-out linear voltage regulator,
- wherein the drivers are configured to receive a first input voltage for driving the fan motor, wherein the first input voltage is the output DC voltage from the AC-to-DC converter, wherein the step-down high efficiency buck converter is configured to receive the first input voltage and to decrease the first input voltage to a second lower voltage, wherein the step-down high efficiency buck converter is configured to output the second lower voltage to the level shifters and to the step down low drop-out linear voltage regulator, wherein the step-down low drop-out linear voltage regulator is configured for receiving the second lower voltage from the step-down high efficiency buck converter and outputting a third lowest voltage which is lower than the second lower voltage, wherein the step down low drop-out linear voltage regulator is electrically coupled to the microcontroller and the third lowest voltage drives the microcontroller.

* * * * *